United States Patent
Choi et al.

(10) Patent No.: US 9,398,611 B2
(45) Date of Patent: Jul. 19, 2016

(54) METHOD FOR ACCESSING CHANNELS IN WIRELESS COMMUNICATION SYSTEMS AND APPARATUS FOR SAME

(71) Applicant: LG Electronics Inc., Seoul (KR)

(72) Inventors: Jinsoo Choi, Anyang-si (KR); Jinsam Kwak, Anyang-si (KR); Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 14/378,597

(22) PCT Filed: Feb. 15, 2013

(86) PCT No.: PCT/KR2013/001193
§ 371 (c)(1),
(2) Date: Aug. 13, 2014

(87) PCT Pub. No.: WO2013/122415
PCT Pub. Date: Aug. 22, 2013

(65) Prior Publication Data
US 2016/0021680 A1 Jan. 21, 2016

Related U.S. Application Data

(60) Provisional application No. 61/598,906, filed on Feb. 15, 2012, provisional application No. 61/600,715, filed on Feb. 20, 2012, provisional application No. 61/601,032, filed on Feb. 21, 2012.

(51) Int. Cl.
*H04W 74/00* (2009.01)
*H04W 52/02* (2009.01)
(Continued)

(52) U.S. Cl.
CPC .......... *H04W 74/002* (2013.01); *H04L 1/1614*
(2013.01); *H04W 52/0216* (2013.01); *H04W 88/08* (2013.01); *Y02B 60/50* (2013.01)

(58) Field of Classification Search
CPC ..................................................... H04W 74/002
See application file for complete search history.

(56) References Cited

U.S. PATENT DOCUMENTS

2012/0063335 A1* 3/2012 Cho ....................... H04W 8/186
370/252
2013/0121221 A1* 5/2013 HomChaudhuri H04W 52/0206
370/311
(Continued)

FOREIGN PATENT DOCUMENTS

KR 1020090026184 3/2009
KR 1020100095524 8/2010
(Continued)

OTHER PUBLICATIONS

International Search Report from PCT/KR2013/001193, dated May 29, 2013;.
(Continued)

*Primary Examiner* — Jason Mattis
(74) *Attorney, Agent, or Firm* — Dentons US LLP

(57) ABSTRACT

The present invention relates to a method for accessing channels in wireless communication systems and to an apparatus for same. More particularly, the method for supporting channel access of a station (STA), which does not belong to a group indicated by a traffic indication map (TIM), includes the steps of: receiving a channel access frame for requesting channel access within a TIM interval from an STA; and transmitting to the STA a response frame including information on whether to allow channel access of the STA in response to the channel access frame, wherein the channel access period of an STA, which belongs to the group, is determined on the basis of a bitmap of the TIM within the TIM interval, and the channel access of the STA is allowed only in a period other than the channel access period of the STA, which belongs to the group.

17 Claims, 31 Drawing Sheets

(51) Int. Cl.
*H04L 1/16* (2006.01)
*H04W 88/08* (2009.01)

(56) References Cited

U.S. PATENT DOCUMENTS

| | | | | |
|---|---|---|---|---|
| 2013/0128798 A1* | 5/2013 | Liu | ...................... | H04W 48/12 370/312 |
| 2013/0142184 A1* | 6/2013 | Wang | .................... | H04L 5/0053 370/338 |
| 2014/0314054 A1* | 10/2014 | Seok | ...................... | H04W 74/04 370/336 |
| 2014/0328238 A1* | 11/2014 | Seok | ...................... | H04W 74/04 370/311 |
| 2015/0009878 A1* | 1/2015 | Kim | .................... | H04W 74/004 370/311 |

FOREIGN PATENT DOCUMENTS

| | | |
|---|---|---|
| KR | 1020110069345 | 6/2011 |
| WO | 2011030956 | 3/2011 |
| WO | 2011149285 | 12/2011 |

OTHER PUBLICATIONS

Written Opinion of the ISA from PCT/KR2013/001193, dated May 29, 2013.

* cited by examiner

METHOD FOR ACCESSING CHANNELS IN WIRELESS COMMUNICATION SYSTEMS AND APPARATUS FOR SAME

This application is a 35 USC §371 National Stage entry of International Application No. PCT/KR2013/001193 filed on Feb. 15, 2013, and claims priority to U.S. Provisional Application Nos. 61/598,906 filed on Feb. 15, 2012; 61/600,715 filed on Feb. 20, 2012 and 61/601,032 filed on Feb. 21, 2012, all of which are hereby incorporated by reference in their entireties as if fully set forth herein.

TECHNICAL FIELD

The present invention relates to a wireless communication system, and more particularly, to a method of accessing a channel in a wireless LAN system and apparatus for supporting the same.

BACKGROUND ART

Recently, various kinds of wireless communication technologies have been developed together with the developments of the information communication technology. Particularly, wireless LAN (WLAN) is the technology for accessing Internet by wireless in a home, a company or a specific service provided area using such a mobile user equipment as a personal digital assistant (PDA), a laptop computer, a portable multimedia player (PMP) and the like based on a radio frequency technology.

In order to overcome the limitation put on a communication speed pointed out as a weak point of WLAN, the recent technology standard has introduced a system having an enhanced speed and reliability of a network and an extended operating distance of a wireless network. For instance, IEEE 802.11n has introduced the application of MIMO (Multiple Inputs and Multiple Outputs) that uses multiple antennas at both ends including a transmitting unit and a receiving unit in order to support high throughput for a data processing speed over maximum 540 Mbps, minimize transmission error, and optimize a data rate or speed.

DISCLOSURE OF THE INVENTION

Technical Tasks

One technical task of the present invention is to provide an enhanced method of accessing a channel in a wireless communication system, and preferably, in a wireless LAN (WLAN) system and apparatus therefor.

Another technical task of the present invention is to provide a method of allowing a channel access in a channel access interval of a different group in a wireless LAN system supportive of a channel access interval specified per group based on a traffic indication map (TIM) and apparatus therefor.

Further technical task of the present invention is to provide a method of preventing a collision with a user equipment belonging to a different group in allowing a channel access in a channel access interval of the different group.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, in supporting a channel access of a station (STA) failing to belong to a group indicated by a TIM (traffic indication map) in a wireless communication system, a method of performing the channel access according to one embodiment of the present invention includes the steps of receiving a channel access frame for a channel access request in an interval of the TIM from the STA and transmitting a response frame including an information on a presence or non-presence of allowance for the channel access of the STA to the STA in response to the channel access frame, wherein a channel access interval of the STA belonging to the group is determined within the TIM interval based on a bitmap of the TIM and wherein the channel access of the STA is allowed only in an interval other than the channel access interval of the STA belonging to the group.

To further achieve these and other advantages and in accordance with the purpose of the present invention, as embodied and broadly described, in supporting a channel access of a station (STA) failing to belong to a group indicated by a TIM (traffic indication map) in a wireless communication system, an apparatus according to another embodiment of the present invention includes a transceiver configured to transceive a radio signal and a processor configured to receive a channel access frame for a channel access request in an interval of the TIM from the STA, the processor configured to transmit a response frame including an information on a presence or non-presence of allowance for the channel access of the STA to the STA in response to the channel access frame, wherein a channel access interval of the STA belonging to the group is determined within the TIM interval based on a bitmap of the TIM and wherein the channel access of the STA is allowed only in an interval other than the channel access interval of the STA belonging to the group.

Preferably, if the channel access frame is received from the STA in the channel access interval of the STA belonging to the group, an information on a channel access allowed interval of the STA in the TIM interval may be transmitted to the STA.

Preferably, the information on the channel access allowed interval may indicate an AID (association ID) related to a bit assigned to the STA among bits except whole bits indicating the STA belonging to the group in the TIM bitmap.

Preferably, the information on the channel access allowed interval may indicate an AID (association ID) related to a bit assigned to the STA among bits not set to 1 in the TIM bitmap.

Preferably, the information on the channel access allowed interval may indicate an AID (association ID) related to a bit assigned to the STA among bits located next to a last bit set to 1 in the bitmap of the TIM.

Preferably, the channel access frame may include a PS-Poll (power save-Poll) frame or an uplink data frame.

Preferably, a temporary AID (association ID) may be assigned to the STA during the channel access allowed interval.

To further achieve these and other advantages and in accordance with the purpose of the present invention, as embodied and broadly described, a method of performing a channel access, which is performed by a station (STA) failing to belong to a group indicated by a TIM (traffic indication map) in a wireless communication system, according to further embodiment of the present invention includes the steps of transmitting a channel access frame for a channel access request in an interval of the TIM to an AP (access point) from the STA and receiving a response frame including an information on a presence or non-presence of allowance for the channel access of the STA from the AP in response to the channel access frame, wherein a channel access interval of the STA belonging to the group is determined within the TIM interval based on a bitmap of the TIM and wherein the channel access of the STA is allowed only in an interval other than the channel access interval of the STA belonging to the group.

To further achieve these and other advantages and in accordance with the purpose of the present invention, as embodied and broadly described, in a station (STA) device failing to belong to a group indicated by a TIM (traffic indication map) in a wireless communication system, an apparatus according to another further embodiment of the present invention includes a transceiver configured to transceive a radio signal and a processor configured to transmit a channel access frame for a channel access request in an interval of the TIM to an AP (access point) from the STA, the processor configured to receive a response frame including an information on a presence or non-presence of allowance for the channel access of the STA from the AP in response to the channel access frame, wherein a channel access interval of the STA belonging to the group is determined within the TIM interval based on a bitmap of the TIM and wherein the channel access of the STA is allowed only in an interval other than the channel access interval of the STA belonging to the group.

Preferably, if the STA transmits the channel access frame in the channel access interval of the STA belonging to the group, an information on a channel access allowed interval of the STA in the TIM interval may be received from the AP.

Preferably, the information on the channel access allowed interval may indicate an AID (association ID) related to a bit assigned to the STA among bits except whole bits indicating the STA belonging to the group in the TIM bitmap.

Preferably, the information on the channel access allowed interval may indicate an AID (association ID) related to a bit assigned to the STA among bits not set to 1 in the TIM bitmap.

Preferably, the information on the channel access allowed interval may indicate an AID (association ID) related to a bit assigned to the STA among bits located next to a last bit set to 1 in the bitmap of the TIM.

Preferably, the channel access frame may include a PS-Poll (power save-Poll) frame or an uplink data frame.

Preferably, a temporary AID (association ID) may be assigned to the STA during the channel access allowed interval.

Advantageous Effects

According to an embodiment of the present invention, provided are an enhanced method of accessing a channel in a wireless communication system, and preferably, in a wireless LAN (WLAN) system and apparatus therefor.

According to an embodiment of the present invention, a channel access in a channel access interval of a different group is allowed in a wireless LAN system supportive of a channel access interval specified per group based on a traffic indication map (TIM) and apparatus therefor.

According to an embodiment of the present invention, a collision with a user equipment belonging to a different group can be prevented in allowing a channel access in a channel access interval of the different group.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention is non-limited.

The General of System

Figure 1:
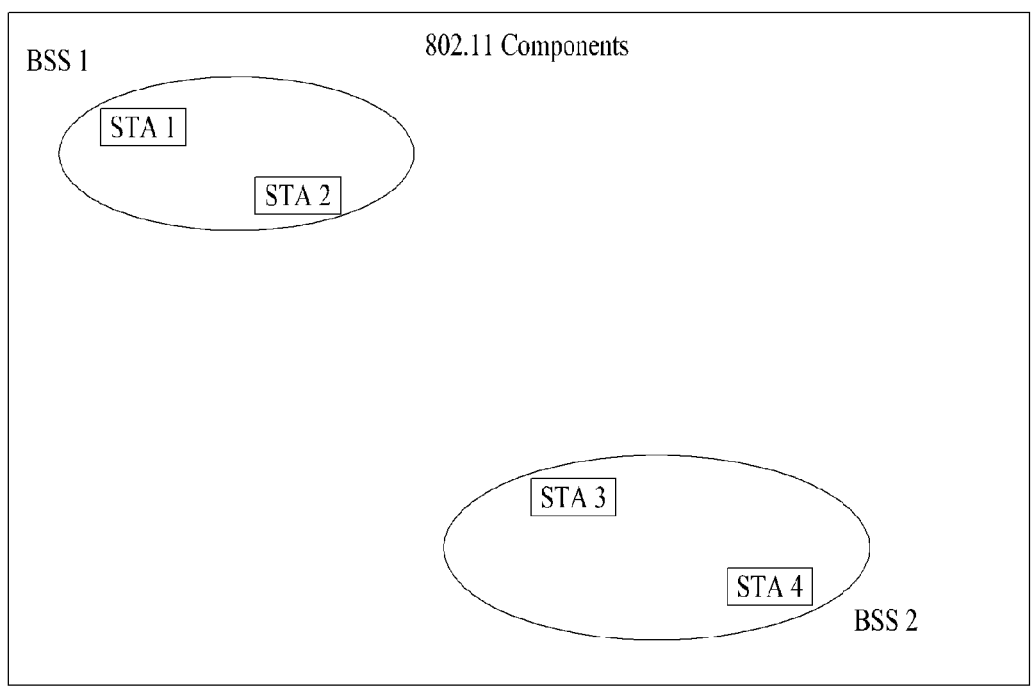
FIG. 1 is a diagram for one example of a structure of IEEE 802.11 system to which the present invention is applicable.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
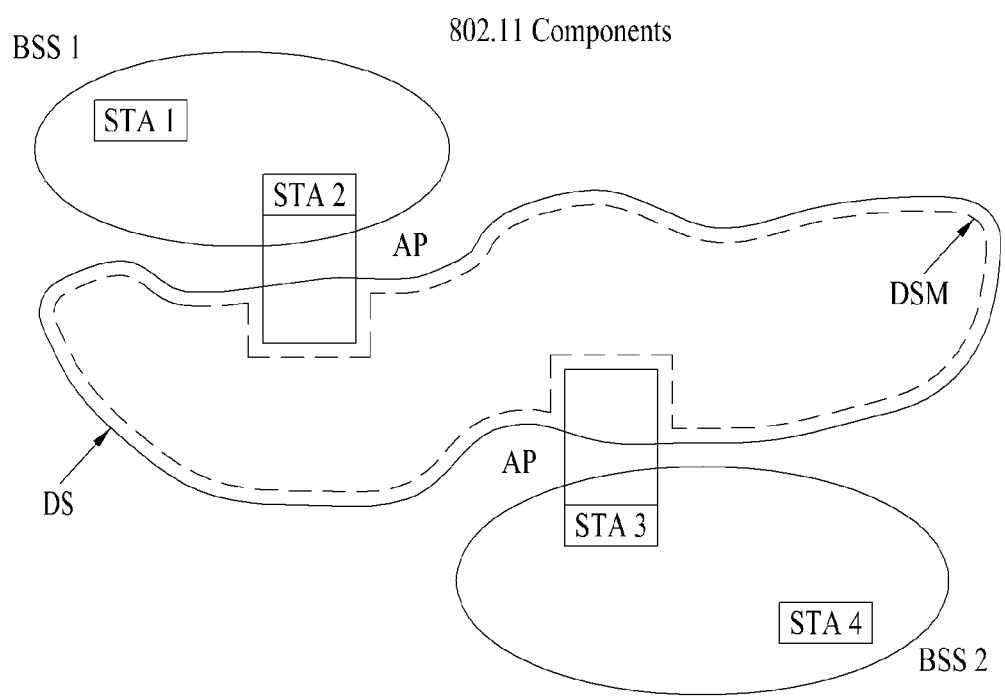
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DSM), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
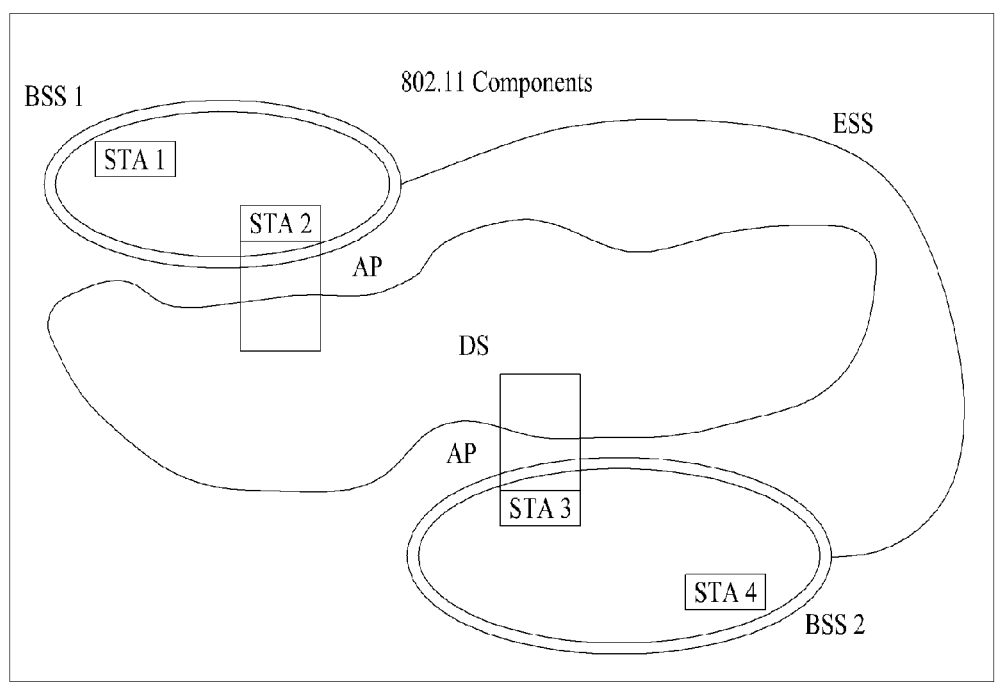
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two different access and security policies are necessary at the same location, and the like.

Figure 4:
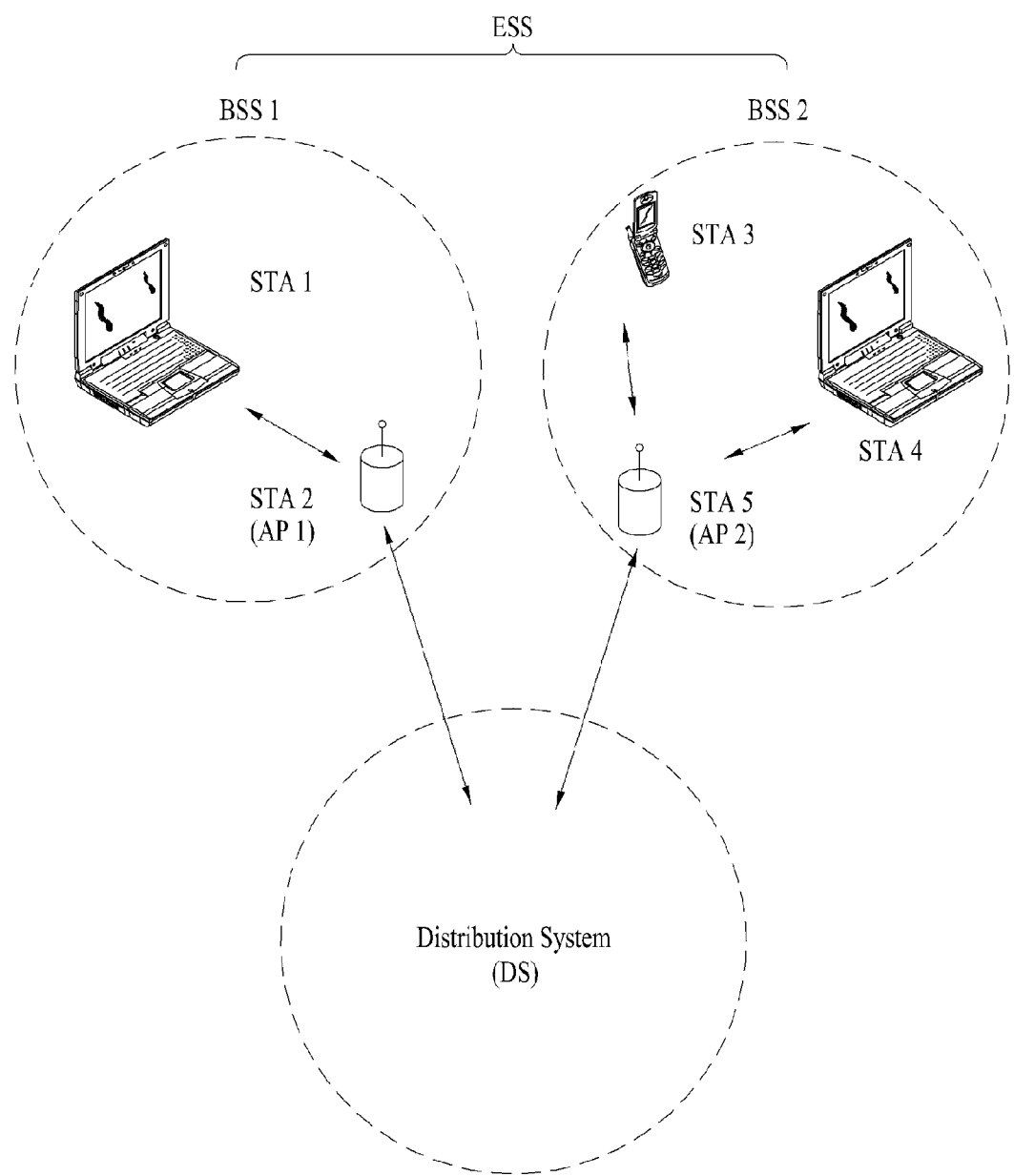
FIG. 4 is a diagram for one example of a structure of WLAN system.

FIG. 4 is a diagram for one example of a structure of WLAN system. In particular, FIG. 4 shows one example of BSS in DS-included infrastructure.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to one of a Base Station (BS), a Node-B, an evolved Node-B (eNB), a Base Transceiver System (BTS), a Femto BS and the like in other wireless communication fields.

Figure 5:
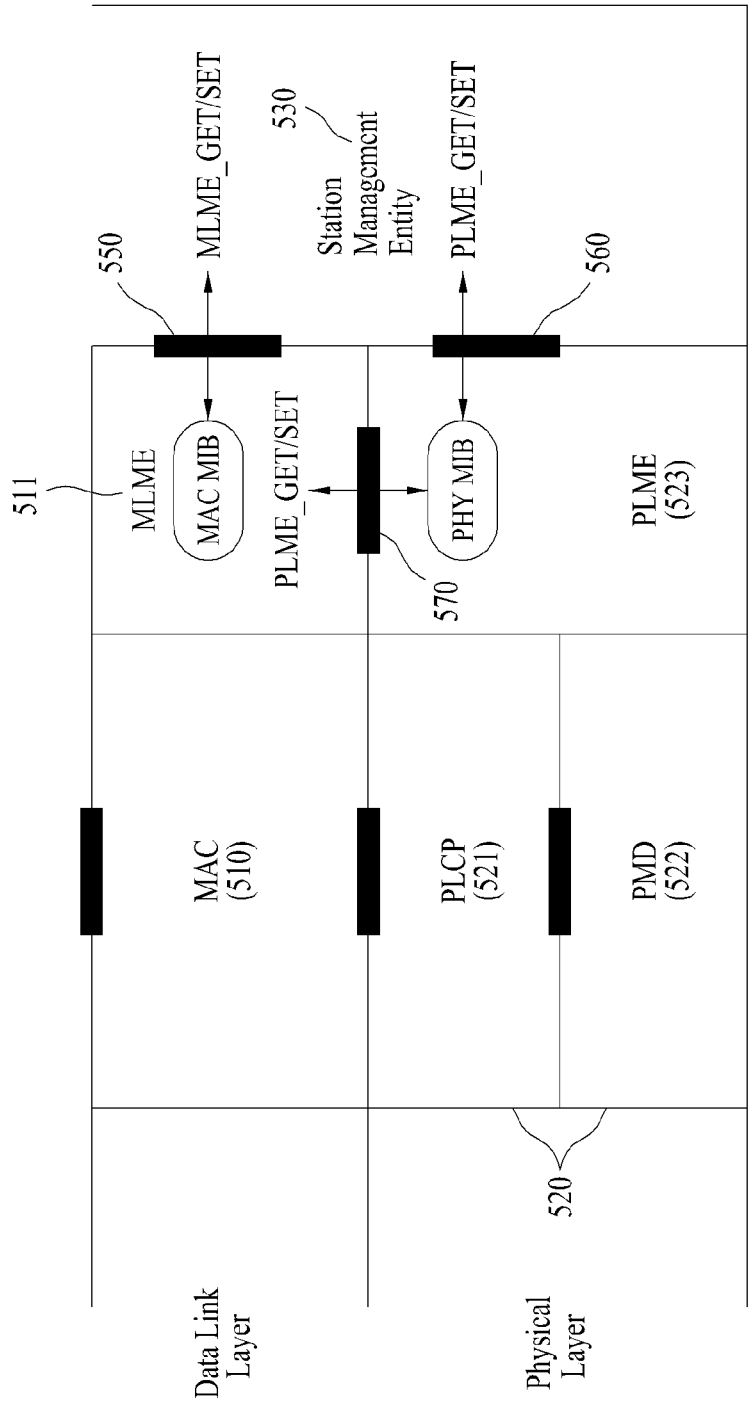
FIG. 5 is a diagram for one example of the structure of a data link layer and a physical layer on IEEE 802.11 system to which the present invention is applicable.

FIG. 5 is a diagram for one example of the structure of a data link layer and a physical layer on IEEE 802.11 system to which the present invention is applicable.

Referring to FIG. 5, a physical layer 520 can include a PLCP entity (Physical Layer Convergence Procedure Entity) 521 and a PMD entity (Physical Medium Dependent Entity) 522. The PLCP entity 521 plays a role in connecting a MAC sublayer 510 and a data frame to each other. The PMD entity 522 plays a role in transceiving data with at least two STAs by wireless using OFDM.

Both of the MAC sublayer 510 and the physical layer 520 can include conceptional management entities that can be named MLME (MAC Sublayer Management Entity) 511 and PLME (Physical Layer Management Entity) 523, respectively. These entities 511 and 521 provide a layer management service interface through an operation of a layer management function.

In order to provide an accurate MAC operation, SME (Station Management Entity) 530 may exist in each user equipment. The SME 530 is a management entity independent from each layer and collects layer based state information from various layer management entities or sets values of specific parameters of the respective layers. The SME 530 can perform such a function instead of general system management entities and can implement a standard management protocol.

The above-mentioned various entities can mutually interact with each other in various ways. In the example shown in FIG. 5, a GET/SET primitive is exchanged. A primitive XX-GET.request is used to request a value of MIB attribute (management information base attribute. If a state is 'SUCCESS', a primitive XX-GET.confirm returns a value of the corresponding MIB attribute. In other cases, an error indication is marked on a state field and then returned. A primitive XX-SET.request is used to make a request for setting a designated attribute as a given value. If the MIB attribute means a specific operation, this request makes a request for executing the corresponding specific operation. If a state is 'SUCCESS', a primitive XX-SET.confirm means that the designated MIB attribute is set to the requested value. In other cases, a state field indicates an erroneous situation. If this MIB attribute means a specific operation, the corresponding primitive can confirm that the corresponding operation has been performed.

Referring to FIG. 5, the MLME 511 & the SME 530 and the PLME 523 & the SME 530 can exchange various primitives through MLME_SAP (MLME_Service Access Point) 550 and PLME_SAP (PLME_Service Access Point) 560, respectively. And, the MLME 511 and the PLME 523 can exchange primitives through MLME-PLME_SAP (MLME-PLME_Service Access Point) 570.

Link Setup Process

Figure 6:
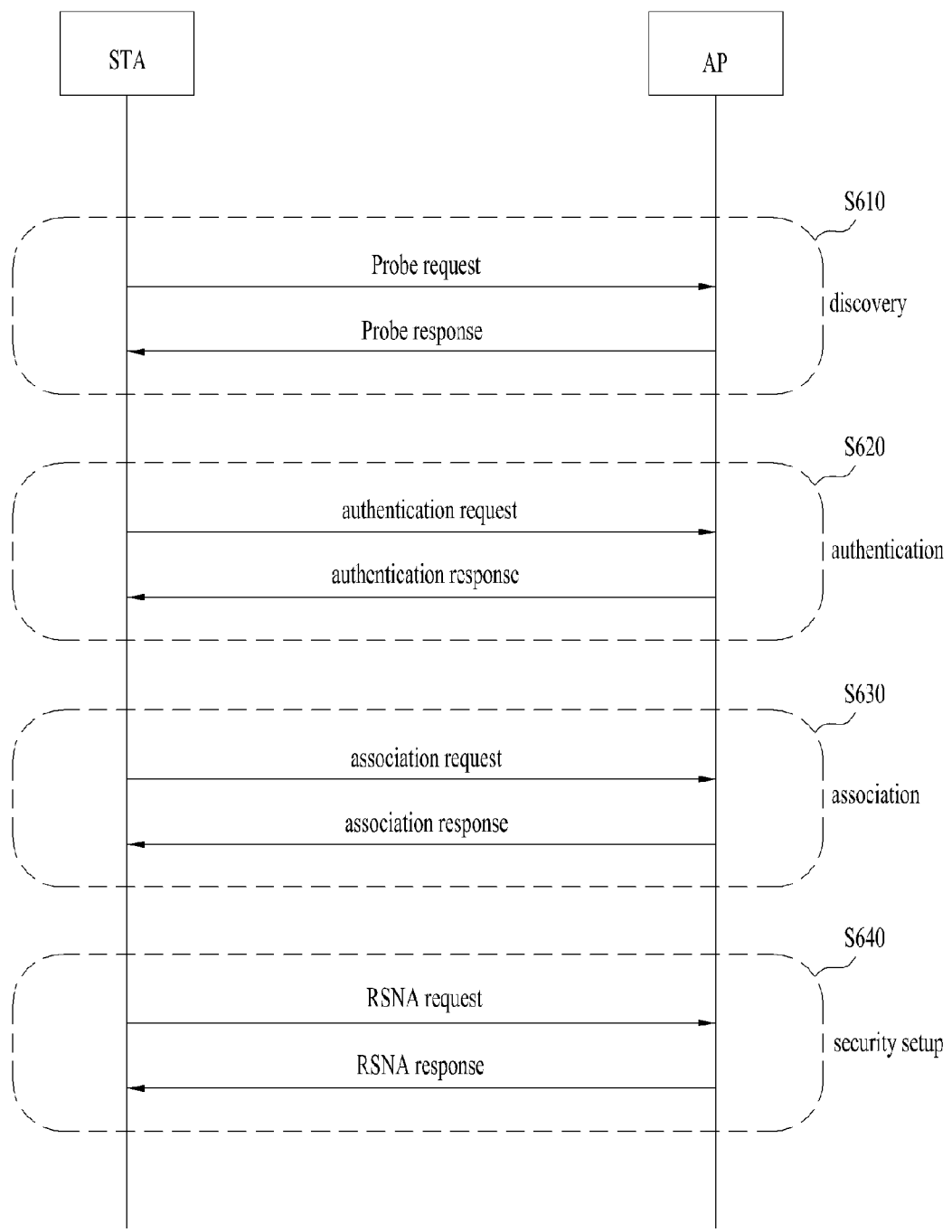
FIG. 6 is a diagram to describe a general link setup process in a WLAN system to which the present invention is applicable.

FIG. 6 is a diagram to describe a general link setup process in a WLAN system to which the present invention is applicable.

In order for an STA to transceive data by setting up a link with a network, the STA should discover a network, perform authentication, establish association, perform an authentication procedure for security, and the like. A link setup process can be named a session initiation process or a session setup process. And, the discovery, authentication, association and security setup steps of the link setup process can be commonly named an association process.

One example of a link setup process is described with reference to FIG. 6 as follows.

In a step S610, an STA can perform a network discovery action. The network discovery action can include a scanning action of the STA. In particular, in order to access the network, the STA should discover a joinable network. The STA needs to identify a compatible network before joining a wireless network. In doing so, a process for identifying a network existing in a specific area is called a scanning.

The scanning can be categorized into an active scanning or a passive scanning.

FIG. 6 shows a network discovery action including an active scanning process. In the active scanning, an STA performing a scanning transmits a probe request frame for searching what kind of AP exists nearby while switching channels and then waits for a response to the transmitted probe request frame. A responder transmits a probe response frame in response to the probe request frame to the STA having transmitted the probe request frame. In this case, the responder may include an STA having transmitted a beacon frame last in a BSS of a scanned channel. In the BSS, since an AP transmits the beacon frame, the AP becomes the responder. In IBSS, since each of STAs within the IBSS transmits the beacon frame in turn, the responder is not fixed. For instance, if an STA transmits a probe request frame on channel #1 and then receives a probe response frame on the channel #1, the STA saves BBS related information contained in the received probe response frame and is then able to perform a scanning in the same manner by switching to a next channel (e.g., channel #2) [i.e., transmission of a probe request on channel #2 and reception of a probe response on channel #2].

The scanning action may be performed by the passive scanning scheme [not shown in FIG. 6]. In the passive scanning, an STA performing the scanning waits for a beacon frame while switching channels. The beacon frame is one of management frames in IEEE 802.11 and is periodically transmitted in order to announce an existence of a wireless network and to enable an STA performing a scanning to discover and join the corresponding wireless network. In a BSS, an AP plays a role in transmitting a beacon frame periodically. In an IBSS, each of STAs within the IBSS transmits a beacon frame in turn. If an STA performing a scanning receives a beacon frame, the corresponding STA saves an information on a BSS included in the beacon frame and then records a beacon frame information on each channel while switching to another channel. Having received the beacon frame, the STA saves a BSS related information contained in the received beacon frame and is then able to perform a scanning on a next channel by switching to the next channel.

Comparing an active scanning and a passive canning to each other, the active scanning is more advantageous than the passive scanning in delay and power consumption.

After the STA has discovered the network, an authentication process can be performed in a step S620. This authentication process can be named a first authentication process to be clearly discriminated from a security setup action in a step S640 described later.

The authentication process includes a following process. First of all, the STA transmits an authentication request frame to the AP. Secondly, the AP transmits an authentication response frame to the STA in response to the authentication request frame. The authentication frame used for the authentication request/response corresponds to a management frame.

The authentication frame can contain informations on an authentication algorithm number, an authentication transaction sequence number, a status code, a challenge text, an RSN (robust security network), a finite cyclic group, and the like. These informations correspond to some example of informations containable in the authentication request/response frame, can be substituted with other information, and may further include additional informations.

The STA can transmit an authentication request frame to the AP. Based on the information contained in the received authentication request frame, the AP can determine whether to allow the authentication of the corresponding STA. The AP is able to provide a result of the authentication processing to the STA through an authentication response frame.

After the STA has been successfully authenticated, an association process can be performed in a step S630. The association process includes a following process. First of all, the STA transmits an association request frame to the AP. Secondly, the AP transmits an association response frame to the STA in response to the association request frame.

For instance, the association request frame can include informations related to various capabilities, e.g., informations on a beacon listen interval, a service set identifier (SSID), supported rates, supported channels, an RSN, a mobility domain, supported operating classes, a TIM (traffic indication map) broadcast request, an interworking service capability and the like.

For instance, the association response frame can include informations related to various capabilities, e.g., informations on a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

These informations correspond to some example of informations containable in the authentication request/response frame, can be substituted with other information, and may further include additional informations.

After the STA has been successfully associated with the network, a security setup process can be performed in a step S640. The security setup process in the step S640 may be called an authentication process through RSNA (robust security network association) request/response. The authentication process of the step S620 may be named a first authentication process, while the security setup process of the step S640 may be simply named an authentication process.

The security setup process of the step S640 can include a private key setup process by 4-way handshaking through EAPOL (extensible authentication protocol over LAN) for example. And, the security setup process can be performed by a security scheme that is not defined in IEEE 802.11 Standard.

Evolution of WLAN

IEEE 802.11n exists as a technology standard stipulated relatively recently in order to overcome the limits put on a communication speed in a wireless LAN. The objects of IEEE 802.11n are to increase a speed and reliability of a network and to extend an operating distance of a wireless network. In particular, IEEE 802.11n supports high throughput (HT) of which data processing speed is equal to or greater than maximum 540 Mbps. In order to minimize transmission error and optimize a data speed or rate, IEEE 802.11n is based on MIMO (multiple inputs and multiple outputs) technology that uses multiple antennas for a transmitting unit end and a receiving end unit both.

As WLAN is supplied widely and actively and applications using WLAN are diversified, the necessity for a new WLAN system to support a throughput higher than a data processing speed supported by IEEE 802.11n is increasingly rising. A next generation WLAN system supportive of VHT (very high throughput) is a next version (e.g., IEEE 802.11ac) of IEEE 802.11n WLAN system and corresponds to one of IEEE 802.11 WLAN systems proposed recently and newly to support a data processing sped over 1 Gbps at a MAC service access point (SAP).

A next generation WLAN system supports a transmission of MU-MIMO (multi user multiple input multiple output) for enabling a plurality of STAs to access a channel simultaneously in order to efficiently use wireless channels. According to MU-MIMO transmission scheme, an AP is able to simultaneously transmit a packet to at least one or more MIMO-paired STAs. And, there has been much discussion about supporting a WLAN system operation on a whitespace. For instance, the introduction of a WLAN system on a TV whitespace (ES) such as a frequency band (e.g., 54~698 MHz band) in idle state due to the digitalization of analog TV has been discussed as IEEE 802.11af Standard. Yet, this is just one example. The whitespace can be regarded as a licensed band that can be incumbently used by a licensed user. In this case, the licensed user means a user that is licensed to use a licensed band. And, the licensed user can be called one of a licensed device, a primary user, an incumbent user and the like.

For instance, an AP and/or STA operation on WS should provide a protection function for a licensed user. For instance, in case that a licensed user such as a microphone is already using a specific WS channel corresponding to a frequency band divided on regulation to have a specific bandwidth on a WS band, an AP and/or STA is unable to use the frequency band amounting to the corresponding WS channel to protect the licensed user. If a licensed user uses a frequency band currently used for a current frame transmission and/or reception, an AP and/or STA should stop using the corresponding frequency band.

Hence, the AP and/or STA should precedently perform a procedure for checking whether a use of a specific frequency band within a WS band is available, i.e., whether a licensed user exists on the frequency band. Checking whether the licensed user exists on the specific frequency band is called a spectrum sensing. As a spectrum sensing mechanism, one of energy detection, signature detection and the like is utilized. If a strength of a received signal is equal to or greater than a predetermined value, it is able to determine that the licensed user currently uses the specific frequency band. If a DTV preamble is detected, it is able to determine that the licensed user currently uses the specific frequency band.

M2M (machine-to-machine) communication technology is currently discussed as a next generation communication technology. In IEEE 802.11 WLAN system, a technology standard for supporting M2M communication is developed as IEEE 802.11ah. The M2M communication means a communication system that includes at least one machine and may be called MTC (machine type communication) or the like. In this case, 'machine' means an entity that does not require direct human manipulation or intervention. For instance, a device such as a wireless communication module installed meter and a wireless communication module installed auto vending machine may correspond to one example of a machine as well as a user device such as a smartphone that can perform a communication by automatically accessing a network without user's manipulation/intervention. The M2M communication can include one of a communication between devices (e.g., a D2D (device-to-device) communication), a communication between a device and a server (e.g., an application server), and the like. As one example of the device-to-server communication, there is a communication between an auto vending machine and a server, a communication between a POS (point of sale) device and a server, a communication between an electricity/gas/water meter and a server, or the like. Besides, M2M communication based applications can include security, transportation, health case and the like. Considering the properties of the application examples, M2M communication should be generally able to support transmission/reception of a small amount of data at a low speed occasionally in an environment in which many devices exist.

In particular, M2M communication should be able to support a large number of STAs. Although a currently defined WLAN system assumes a case that maximum 207 STAs are associated with a single AP, methods for supporting a case that a number of STAs more than 2007 STAs are associated with a single AP are currently discussed in M2M communication. Moreover, in M2M communication, it is estimated that there will be many applications that support/require a low transmission speed. In order to support this smoothly, for instance, in WLAN system, an STA is able to recognize a presence or non-presence of data, which is to be transmitted to the STA, based on TIM (traffic indication map) element. And, methods for reducing a bitmap size of TIM are currently discussed. Moreover, in M2M communication, it is estimated that there will be many traffics that have a considerably long transmission/reception interval. For instance, like an electricity/gas/water used amount, it is required to transceive a considerably small amount of data in each long periodicity (e.g., 1 month, etc.). Hence, although the number of STAs associable with a single AP increases highly, methods for efficiently supporting a case that the number of STAs having a data frame supposed to be received from an AP in a single beacon periodicity is considerably small are currently discussed.

Thus, the WLAN technology is evolving fast and technologies for a direct link setup, an enhancement of media streaming performance, support of a fast and/or large-scale initial session setup, support of an extended bandwidth and operating frequency, and the like are currently developed.

Frame Structure

Figure 7:
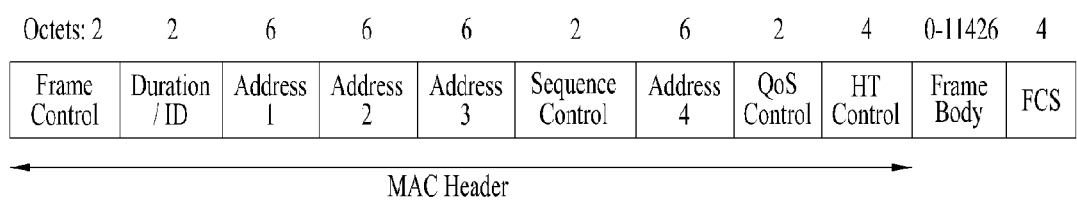
FIG. 7 shows one example of a MAC frame format of IEEE 802.11 system to which the present invention is applicable.

FIG. 7 shows one example of a MAC frame format of IEEE 802.11 system to which the present invention is applicable.

Referring to FIG. 7, a MAC frame format includes a MAC header (MHR), a MAC payload and a MAC footer (MFR). The MHR is defined as a region including a frame control field, a duration/identifier (duration/ID) field, an address 1 field, an address 2 field, an address 3 field, a sequence control field, an address 4 field, a QoS control field, and an HT control field. A frame body field is defined as a MAC payload. Data desired to be transmitted by an upper layer is located in the frame body field. And, the frame body field has a variable size. A frame check sequence (FCS) field is defined as a MAC footer and is used for an error search of a MAC frame.

The first 3 fields (i.e., the frame control field, the duration/ID field, and the address 1 field) configure a minimum frame format and exist in all frames. And, other fields can exist in a specific frame type only.

Informations included in the respective fields mentioned in the above description can follow the definition of IEEE 802.11 system. The respective fields mentioned in the foregoing description correspond to examples of the fields that can be included in the MAC frame, may be substituted with other fields, or may further include additional fields.

Figure 8:
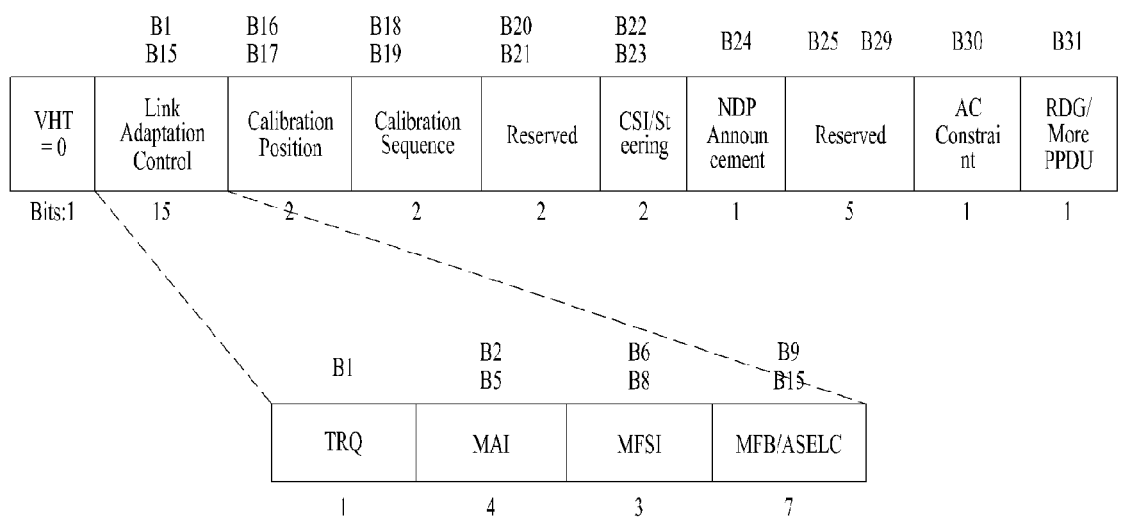
FIG. 8 shows one example of HT format of HT Control field in MAC frame according to FIG. 7.

FIG. 8 shows one example of HT format of the HT control field in the MAC frame according to FIG. 7.

Referring to FIG. 8, the HT control field may include a VHT subfield, a link adaptation subfield, a calibration position subfield, a calibration sequence subfield, a CSI/Steering (channel state information/steering) subfield, an NDP (null data packet) announcement subfield, an AC (access category) constraint subfield, an RDG/More PPDU (reverse direction grant/More PPDU) subfield, a reserved subfield, and the like.

The link adaption subfield can include a TRQ (training request) subfield, an MAI [MCS (modulation and coding scheme) request or ASEL (antenna selection) indication] subfield, an MFSI (MCS feedback sequence identifier) subfield, an MFB/ASELC (MCS feedback and antenna selection command/data) subfield, and the like.

If a request for a sounding PPDU transmission is made to a responder, the TRQ subfield is set to 1. If a request for a sounding PPDU transmission is not made to a responder, the TRQ subfield is set to 0. If the MAI subfield is set to 14, it means an antenna selection (ASEL) indication and the MFB/ASELC subfield is interpreted as antenna selection command/data. Otherwise, the MAI subfield indicates an MCS request and the MFB/ASELC subfield is interpreted as an MCS feedback. When the MAI subfield indicates an MCS request (MRQ), if any MCS feedback is not requested, the MAI subfield is set to 0. If the MCS feedback is requested, the MAI subfield is set to 1. The sounding PPDU means PPDU that carries a training symbol usable for channel estimation.

The respective subfields mentioned in the above description correspond to examples of the subfields that can be included in the HT control field, may be substituted with other subfields, or may further include additional subfields.

Figure 9:
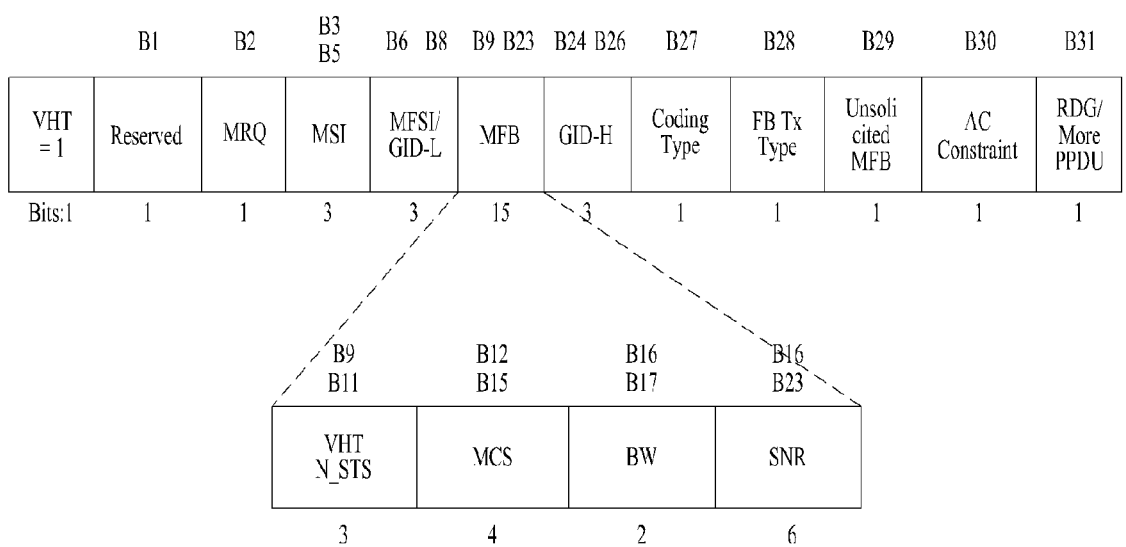
FIG. 9 shows one example of VHT format of HT Control field in MAC frame according to FIG. 7.

FIG. 9 shows one example of VHT format of the HT control field in the MAC frame according to FIG. 7.

Referring to FIG. 9, the HT control field may include a VHT subfield, an MRQ subfield, an MSI subfield, an MCS feedback sequence indication/group ID least significant bit (MFSI/GID-L (LSB of Group ID)) subfield, an MFB subfield, a group ID most significant bit (GID-H (MSB of Group ID)) subfield, a coding type subfield, an MFC response transmission type (FB Tx Type: Transmission type of MFB response) subfield, an unsolicited MFB subfield, an AC constraint subfield, an RDG/More PPDU subfield, and the like. And, the MFB subfield may include a VHT N_STS (Number of space time streams) subfield, an MCS subfield, a BW (bandwidth) subfield, an SNR (Signal to Noise Ratio) subfield, and the like.

Table 1 shows descriptions of the respective subfields in the VHT format of the HT control field.

TABLE 1

| Subfield | Meanings | Definitions |
|---|---|---|
| MRQ | MCS request | This is set to 1 if an MCS feedback (solicited MFB) is requested. Otherwise, this is set to 0. |
| MSI | MRQ sequence identifier | If MRQ subfield is set to 1, MSI subfield includes a sequence number ranging from 0 to 6. If MRQ subfield is set to 0, MSI subfield is reserved. |
| MFSI/GID-L | MFB sequence identifier/LSB of Group ID | Of unsolicited) MFB subfield is set to 0, MFSI/GID-L subfield includes a reception value of MSI included in the frame indicated by MFB information. If unsolicited MFB subfield is set to 1, MFSI/GID-L subfield includes 3 LSBs of group ID of PPDU indicated by unsolicited MFB. |
| MFB | VHT N_STS, MCS, BW, SNR feedback | MFB subfield indicates recommended MF. If MCS = 15 and VHT N_STS = 7, it indicates that no feedback exists. |
| GID-H | MSB of Group ID | If unsolicited MFB subfield is set to 1, GID-H subfield includes 3 MSBs of group ID of PPDU indicated by unsolicited MFB. |
| Coding Type | Coding type of MFB response | If unsolicited MFB subfield is set to 1, coding type subfield includes coding information (e.g., 1 in case of BCC (binary convolutional code), 0 in case of LDPC (low-density parity check). Otherwise, this subfield is reserved. |
| FB Tx Type | Transmission type of MFB response | If unsolicited MFB subfield is set to 1 and FB Tx Type subfield is set to 0, unsolicited MFB indicates one of a transmit diversity using unbeamformed VHT PPDU and a transmit diversity using STBC (space-time block coding) VHT PPDU. If unsolicited MFB subfield is set to 1 and FB Tx Type subfield is set to 1, unsolicited MFB indicates beamformed SU-MIMO (Single User MIMO) VHT PPDU. Otherwise, this subfield is reserved. |
| Unsolicited MFB | Unsolicited MCS feedback indicator | If MFB is not a response to MRQ, this subfield is set to 1. If MFB is a response to MRQ, this subfield is set to 0. |
| AC Constraint | | If a response to a reverse direction grant (RDG) includes a data frame from a prescribed TID (traffic identifier), this subfield is set to 0. If a response to a reverse direction grant (RDG) includes a frame from the same AC of a last data frame received from a same reverse direction (RD) initiator), this subfield is set to 1. |
| RDG/More PPDU | | If RDG/More PPDU subfield is set to 0, it indicates that there is no reverse direction grant (RDG) in case of a transmission from a reverse direction (RD) initiator or that PPDU carrying MAC frame is a final transmission in case of a transmission from a reverse direction (RD) responder. If RDG/More PPDU subfield is set to 1, it indicates that a reverse direction grant (RDG) exists in case of a transmission from a reverse direction (RD) initiator or that PPDU carrying a MAC frame is followed by another PPDU in case of a transmission from a responder. |

The respective subfields mentioned in the above description correspond to examples of the subfields that can be included in the HT control field, may be substituted with other subfields, or may further include additional subfields.

Meanwhile, a MAC sublayer delivers a MAC protocol data unit (MPDU) to a physical layer as a physical (PHY) service data unit (PSDU). A PLCP entity generates PLCP protocol data unit (PPDU) by attaching a physical (PHY) header and a preamble to the received PSDU.

Figure 10:
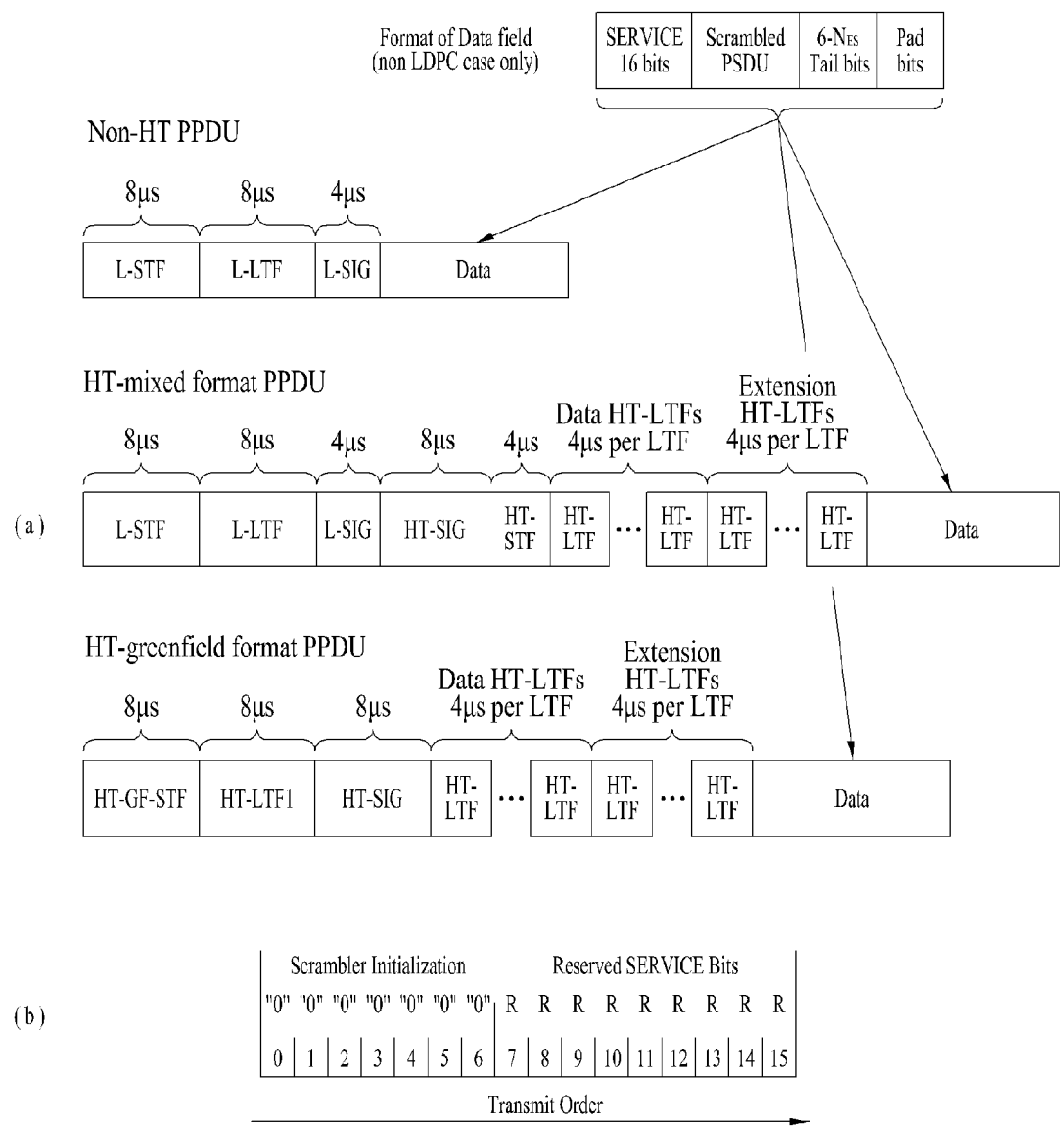
FIG. 10 shows one example of PPDU frame format of IEEE 802.11n system to which the present invention is applicable.

FIG. 10 shows one example of PPDU frame format of IEEE 802.11n system to which the present invention is applicable.

FIG. 10 (a) shows one example of PPDU frames according to a non-HT format, an HT mixed format and an HT-greenfield format.

The non-HT format indicates a frame format for an existing legacy system (IEEE 802.11 a/g) STA. The non-HT format PPDU includes a legacy format preamble consisting of L-STF (Legacy-Short Training field), L-LTF (Legacy-Long Training field) and L-SIG (Legacy-Signal) field.

The HT mixed format allows a communication of an existing legacy system STA and also indicates a frame format for IEEE 802.11n STA. The HT mixed format PPDU includes a legacy format preamble consisting of L-STF, L-LTF and L-SIG and an HT format preamble consisting of HT-STF (HT-Short Training field), HT-LTF (HT-Long Training field) and HT-SIG (HT-Signal) field. Since the L-STF, L-LTF and L-SIG mean the legacy fields for backward compatibility), a configuration from L-STF to L-SIG is identical to that of the non-HT format. And, an STA is able to recognize the mixed format PPDU using a following HT-SIG field.

The HT-Greenfield format is not compatible with an existing legacy system and indicates a frame format for IEEE 802.11n ST. The HT-Greenfield format PPDU includes a greenfield preamble consisting of HT-GF-STF (HT-Greenfield-STF), HT-LTF1, HT-SIG and at least one HT-LTF.

The data field includes a SERVICE field, PSDU, tail bit, and pad bit. All bots of the data field are scrambled.

FIG. 10 (b) shows a service field included in the data field. The service field retains 16 bits. The bits are numbered by 0 to 15. And, the bits are sequentially transmitted by starting with the bit #0. The bits #0 to #6 are set to 0 and used to synchronize a descrambler within a receiving end.

Figure 11:
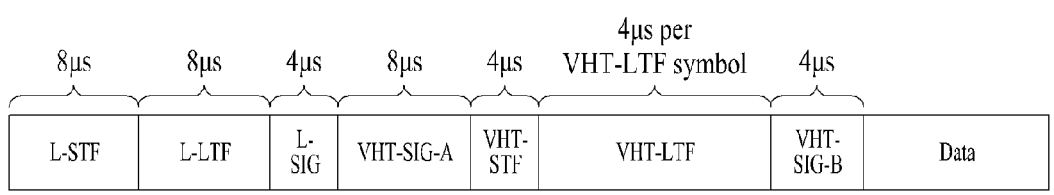
FIG. 11 shows one example of VHT PPDU frame format of IEEE 802.11ac system to which the present invention is applicable.

FIG. 11 shows one example of VHT PPDU frame format of IEEE 802.11ac system to which the present invention is applicable.

Referring to FIG. 11, VHT format PPDU includes a legacy format preamble consisting of L-STF, L-LTF and L-SIG and a VHT format preamble consisting of VHT-SIG-A, HT-STF and HT-LTFs before a data field. Since the L-STF, L-LTF and L-SIG mean the legacy fields for backward compatibility, a configuration from the L-STF to the L-SIG is identical to that of the non-HT format and an STA is able to recognize the VHT format PPDU using a following VHT-SIG field.

The L-STF is the field for frame detection, AGC (Auto Gain Control), diversity detection, coarse frequency/time synchronization, and the like. The L-LTF is the field for fine frequency/time synchronization, channel estimation and the like. The L-SIG is the field for legacy control information transmission. The VHT-SIG-A is the VHT field for common control information transmission of VHT STAs. The VHT-STF is the field for AGC for MIMO and a beamformed stream. The VHT-LTFs is the field for channel estimation for MIMO and a beamformed stream. And, the VHT-SIG-B is the field for transmitting a control information specified for each STA.

Medium Access Mechanism

In WLAN system according to IEEE 802.11, a basic access mechanism of MAC (medium access control) is a CSMA/CA (carrier sense multiple access with collision avoidance) mechanism. The CSMA/CA mechanism may be called DCF (distributed coordination function) of IEEE 802.11 MAC and basically employees an access mechanism 'listen before talk'. According to an access mechanism of such a type, before initiating a transmission, an AP and/or STA can perform CCA (clear channel assessment) for sensing a radio channel or medium during a prescribed time interval (e.g., DIFS (DCF inter-frame space). As a result of the sensing, if it is determined that a medium is in idle status, the AP and/or STA starts a frame transmission through a corresponding medium. On the contrary, if it is detected that a medium is in occupied status, the corresponding AP and/or STA sets up a delay interval (e.g., a random backoff period) for a medium access instead of starting its own transmission, stands by, and is then able to attempt a frame transmission. Since several STAs are expected to attempt frame transmission after standbys for different times owing to the application of the random backoff period, it is able to minimize collision.

IEEE 802.11 MAC protocol provides HCF (hybrid coordination function). The HCF is based on the DCF and PCF (point coordination function). The PCF corresponds to a polling-based synchronous access scheme and means a scheme of performing polling periodically in order for all receiving APs and/or STAs to receive data frame. The HCF has EDCA (enhanced distributed channel access) and HCCA (HCF controlled channel access). The EDCA uses a contention based access scheme for a provider to provide a data frame to multiple users. And, the HCCA uses a non-contention based channel access scheme using a polling mechanism. The HCF includes a medium access mechanism for improving QoS (quality of service) of WLAN and is able to transmit QoS data in both a contention period (CP) and a contention free period (CFP).

Figure 12:
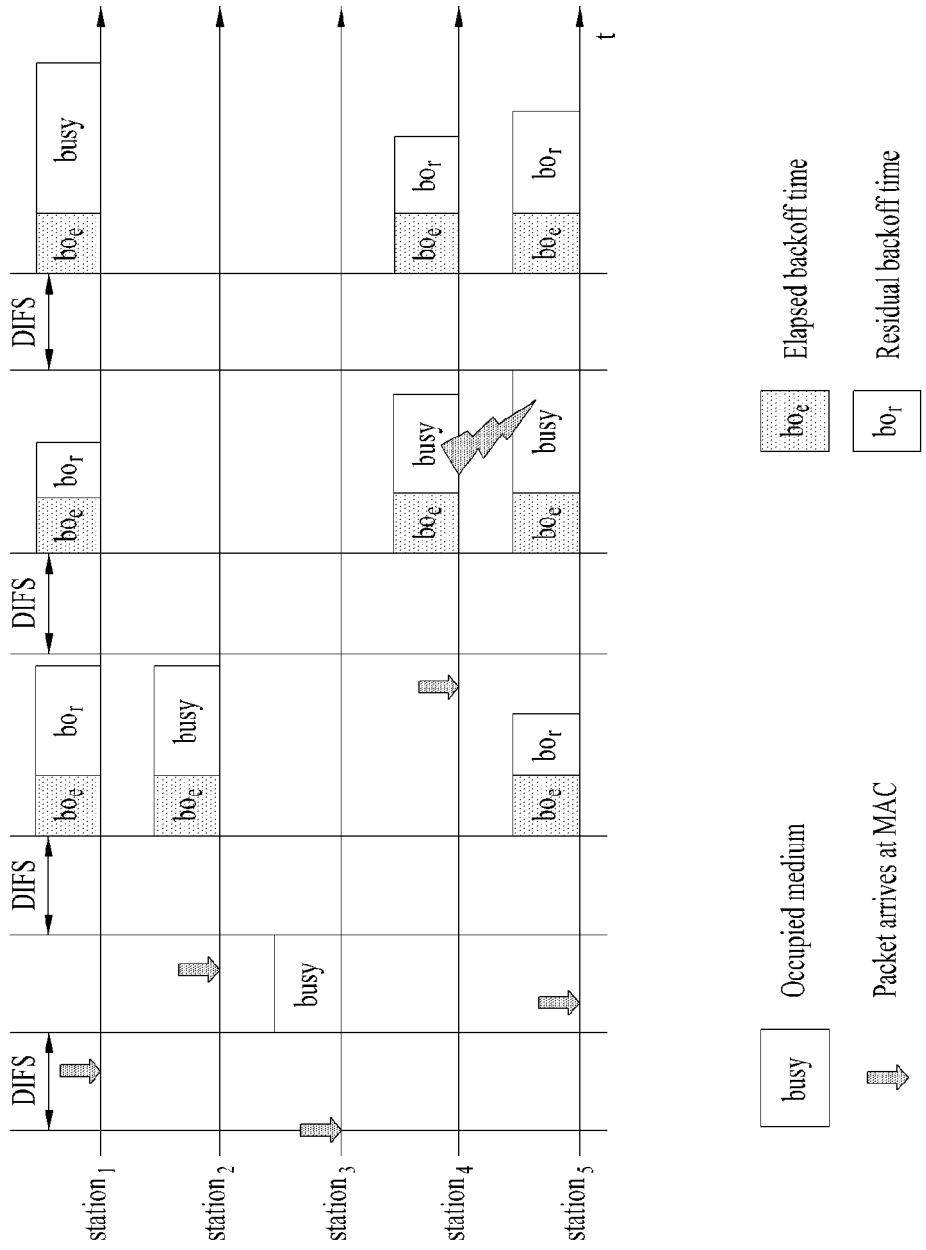
FIG. 12 is a diagram to describe a back-off process in a WLAN system to which the present invention is applicable.

FIG. 12 is a diagram to describe a backoff process in a WLAN system to which the present invention is applicable.

An operation based on a random backoff period is described with reference to FIG. 12 as follows.

First of all, if a medium in occupied or busy status enters an idle status, several STAs can attempt data (or frame) transmission. In doing so, according to a scheme of minimizing collision, each of the STAs selects a random backoff count, stands by in a slot time amounting to the selected random backoff count, and is then able to attempt the transmission. The random backoff count has a pseudo-random integer value and can be determined as 0 or one of values in a CW range. In this case, the CW is a contention window parameter value. CWmin is given as an initial value to the CW parameter. Yet, if the transmission fails [e.g., ACK for a transmitted frame is not received], the CW parameter can take a doubled value. If the CW parameter value becomes CWmax, the data transmission can be attempted by maintaining the CWmax value until the data transmission becomes successful. If the data transmission is successfully completed, the CW parameter value is rest to the CWmin value. Preferably, a value of each of the CW, CWmin and CWmax is set to (2n−1), where n=0, 1, 2 . . . .

If a random backoff process starts, the STA keeps monitoring a medium while a backoff slot is counted down according to the determined backoff count value. If the STA monitors that the medium is in a busy status, the STA waits by stopping the countdown. If the medium enters the idle status, the STA resumes the remaining countdown.

Figure 17:
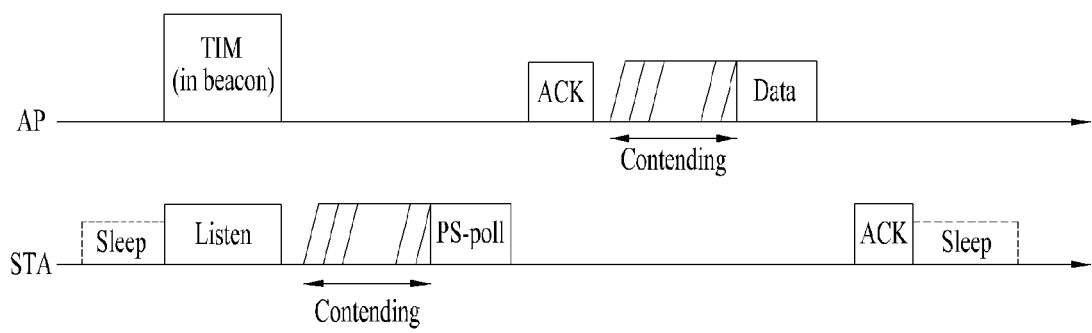

In the example shown in FIG. 12, in case that a packet to be transmitted arrives at the MAC of STA3, the STA3 confirms that the medium is in idle status and is then able to directly transmit a frame. Meanwhile, the rest of the STAs monitor that the medium is in busy status and stands by. In doing so, since data to be transmitted may be generated from each of STA1, STA2 and STA5, each of the STAs stands by for DIFS if monitoring that the medium is in idle status and is then able to count down a backoff slot according to a random backoff count value selected by itself. In the example shown in FIG. 17, the STA2 selects a smallest backoff count value and the STA1 selects a biggest backoff count value. In particular, FIG. 17 shows one example that a residual backoff time of the STA5 is shorter than that of the STA1 at the timing point at which the STA2 finishes the backoff count and starts a frame transmission. Each of the STA1 and the STA5 stops the countdown temporarily and stands by, while the STA2 occupies the medium. As the occupation by the STA2 is ended, if the medium enters the idle status again, each of the STA1 and the STA5 stands by for DIFS and then resumes the paused backoff count. In particular, the frame transmission can be started after the rest of backoff slots amounting to the residual backoff time have been counted down. Since the residual backoff time of the STA5 is shorter than that of the STA1, the STA5 starts the frame transmission. Meanwhile, while the STA2 occupies the medium, data can be generated from the STA4. In doing so, from the viewpoint of the STA4, if the medium enters an idle status, the STA4 stands by for DIFS, performs a countdown according to a random backoff count value selected by itself, and is then able to start a frame transmission. FIG. 12 shows one example of a case that a residual backoff time of the STA5 accidently coincides with a random backoff count value of the STA4. In this case, collision may occur between the STA4 and the STA5. In case that the collision occurs, each of the STA4 and the STA5 is unable to receive ACK and fails in the data transmission. In this case, each of the STA4 and the STA5 doubles a CW value, selects a random backoff count value, and is then able to perform a countdown. Meanwhile, the STA1 stands by while the medium is in the occupied (or busy) status due to the transmissions by the STA4 and the STA5. If the medium enters an idle status, the STA1 stands by for DIFS. If the residual backoff time elapses, the STA1 is able to start the frame transmission.

Sensing Operation of STA

As mentioned in the foregoing description, the CSMA/CA mechanism includes a virtual carrier sensing as well as a physical carrier sensing for an AP and/or STA to directly sense a medium. The virtual carrier sensing is provided to complement such a problem, which may be generated from a medium access, as a hidden node problem and the like. For the virtual carrier sensing, MAC of WLAN system is able to use a network allocation vector (NAV). The NAV is a value for an AP and/or STA currently using a medium or having an authority to use to indicate a time, which is left until a medium enters an available status, to another AP and/or STA. Hence, the value set as the NAV corresponds to a period scheduled for an AP and/or STA transmitting a corresponding frame to use a medium. If an STA receives the NAV value, the STA is prohibited from a medium access during the corresponding period. For instance, the NAV can be set according to a value of a duration field of a MAC header of a frame.

In order to reduce possibility of collision, a robust collision detecting mechanism has been introduced. This shall be described with reference to FIG. 18 and FIG. 19. Although a carrier sensing range and a carrier transmission range may not be actually identical to each other, assume that the two ranges are identical to each other for clarity of the following description.

Figure 13:
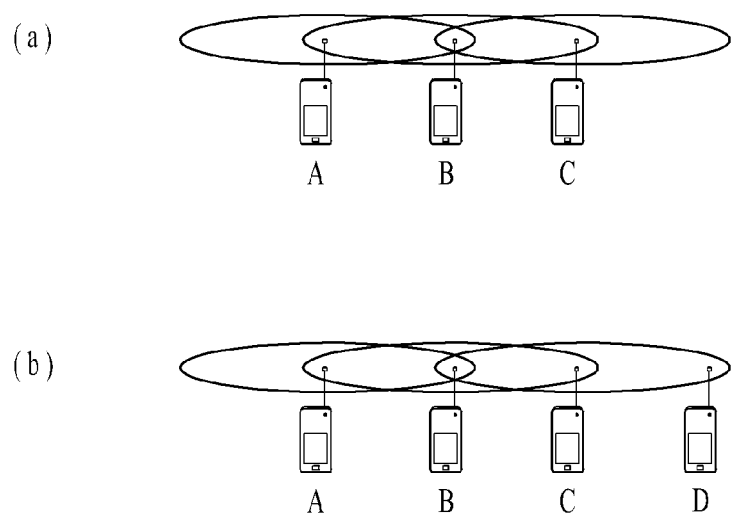
FIG. 13 is a diagram to describe a hidden node and an exposed node.

FIG. 13 is a diagram to describe a hidden node and an exposed node.

FIG. 13 (a) shows one example of a hidden node, which corresponds to a case that STA C has an information to transmit in the course of a communication between STA A and STA B. In particular, despite a situation that the STA is transmitting an information to the STA B, the STA C can determine that a medium is in idle status when the STA C performs a carrier sensing before sending data to the STA B. The reason for this is that a transmission (i.e., a medium occupation) by the STA A may not be sensed at a location of the STA C. In this case, since the STA B receives both information of the STA A and information of the STA C simultaneously, a collision occurs. In doing so, the STA A can be called a hidden node of the STA C.

FIG. 13 (b) shows one example of an exposed node, which corresponds to a case that STA C has an information to transmit to STA D in a situation that STA B is transmitting data to STA A. In doing so, if the STA C performs a carrier sensing, it is able to determine that a medium is occupied due to the transmission by the STA B. Hence, although the STA C has the information to transmit to the STA D, since the medium occupied status is sensed, the STA C should stand by until the medium enters an idle status. Yet, since the STA A is actually located out of a transmission range of the STA C, the transmission from the STA C and the transmission from the STA B may not collide with each other from the viewpoint of the STA A, the STA C may stand by unnecessarily until the STA B stops the transmission. In doing so, the STA C can be called an exposed node of the STAB.

Figure 14:
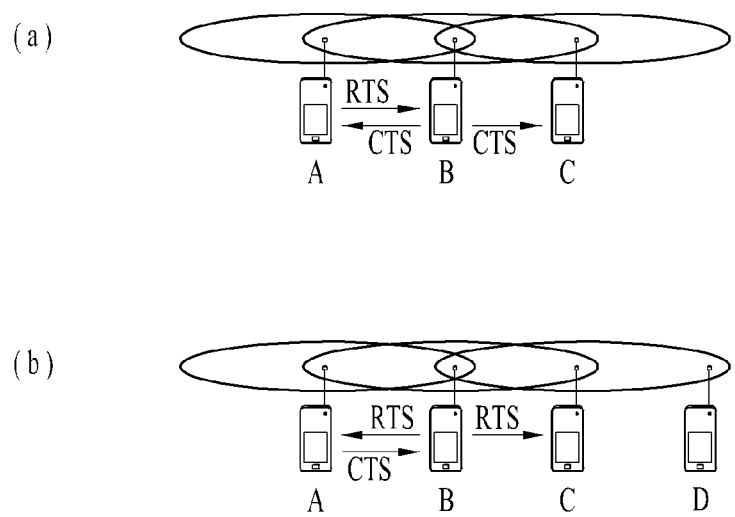
FIG. 14 is a diagram to describe RTS and CTS.

FIG. 14 is a diagram to describe RTS and CTS.

First of all, in order to efficiently use a collision avoidance mechanism in the exemplary situation shown in FIG. 13, it is able to use such a short signaling packet as RTS (request to send), CTS (clear to send) and the like. In order to enable neighbor STA(s) to overhear, RTS/CTS between two STAs can be set to enable the neighbor STA(s) to consider whether to perform an information transmission between the two STAs. For instance, if a data transmitting STA transmits an RTS frame to a data receiving STA, the data receiving STA is able to announce that it will receive data by transmitting a CTS frame to neighbor user equipments.

FIG. 14 (a) shows one example of a method of solving a hidden node problem, which assumes a case that both STA A and STA C intend to transmit data to STA B. if the STA A sends RTS to the STA B, the STA B transmits CTS to both of the STA A and the STA C neighboring to the STA B. As a result, the STA C stands by until the data transmission between the STA A and the STA B ends, whereby collision can be avoided.

FIG. 14 (b) shows one example of a method of solving an exposed node problem. As STA C overhears RTS/CTS transmission between STA A and STA B, the STA C can determine that collision will not occur despite that the STA C transmits data to another STA (e.g., STA D). In particular, the STA B transmits RTS to all neighbor user equipments and the STA A having data to send actually transmits CTS only. Since the STA C receives the RTS but fails in receiving the CTS of the STA A, the STA C can recognize that the STA A is out of a carrier sensing of the STA C.

Power Management

As mentioned in the foregoing description, in WLAN system, STA should perform a channel sensing before performing transmission/reception. Yet, sensing a channel all the time requires a consistent power consumption of the STA. there is no big difference between a power consumption in reception status and a power consumption in transmission status. And, keeping the reception status puts a burden on a power-limited STA (i.e., a battery-operable STA). Hence, if an STA maintains a reception standby status in order to consistently sense a channel, it consumes a power inefficiently without special advantages in aspect of WLAN throughput. In order to solve this problem, a WLAN system supports a power management (PM) mode of STA.

The power management mode of STA can be divided into an active mode and a power save mode. The STA basically operates in active mode. The STA operating in active mode maintains an awake state. The awake state means a state in which a normal operation such as a frame transceiving, a channel scanning and the like is possible. On the other hand, the STA operating in PS mode operates in a manner of switching between a sleep state and an awake state. The STA operating in sleep state operates with a minimum power but does not perform a channel scanning as well as a frame transceiving.

Since a power consumption decreases if an STA operates in sleep state as long as possible, an operating period of the STA increases. Yet, since a frame transceiving is impossible in the sleep state, the STA is unable to operate long unconditionally. If there is a frame an STA operating in sleep state will transmit to an AP, the STA can transmit a frame by switching to an awake state. On the contrary, if there is no frame the AP will transmit to the STA, the STA in the sleep state is unable to receive the frame and is also unable to recognize a presence of the frame to receive. Hence, the STA may need an operation of switching to an awake state in accordance with specific periodicity in order to recognize a presence or non-presence of a frame to be transmitted to the corresponding STA (or, in order to receive the frame if the frame is present).

Figure 15:
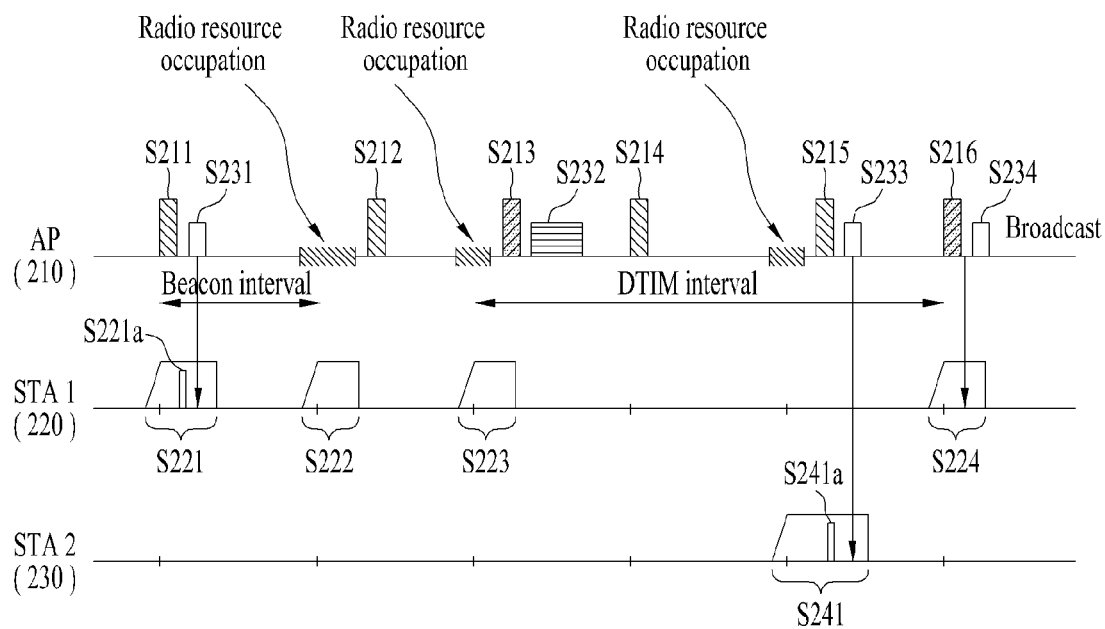
FIG. 15 is a diagram to describe a power management operation.

FIG. 15 is a diagram to describe a power management operation.

Referring to FIG. 15, an AP 210 transmits beacon frames to STAs in a BSS by predetermined periods [S211, S212, S213, S214, S215, S216]. In the beacon frame, a TIM (traffic indication map) information element is contained. The TIM information element contains an information for the AP 210 to indicate that there is a buffered traffic for STAs associated with the AP 210 and that the AP 210 will transmit a frame. TIM element may include a TIM used to indicate a unicast frame and a DTIM (delivery traffic indication map) used to indicate a multicast or broadcast frame.

The AP 210 can transmit the DTIM once per 3 transmissions of the beacon frames.

STA1 220 and STA2 230 are STAs operating in PS mode. Each of the STA1 220 and the STA2 230 can be set to receive the TIM element transmitted by the AP 210 by switching to an awake state from a sleep state in every wakeup interval of prescribed periodicity. Each of the STAs can calculate a timing point of switching to an awake state based on its local clock. In the example shown in FIG. 15, assume that the clock of the STA coincides with a clock of the AP.

For instance, the prescribed wakeup interval can be set for the STA1 220 to receive the TIM element by switching to the awake state in every beacon interval. Hence, when the AP 210 transmits the beacon frame for the $1^{st}$ time [S211], the STA1 220 can switch to the awake state [S221]. The STA1 220 receives the beacon frame and is able to acquire the TIM element. If the acquired TIM element indicates that there is a frame to be transmitted to the STA1 220, the STA1 220 can transmit a PS-Poll (Power Save-Poll) frame, which is provided to make a request for a frame transmission to the AP 210, to the AP 210 [S221a]. The AP 210 is able to transmit a frame to the STA1 220 in response to the PS-Poll frame [S231]. Having received the frame, the STA1 220 operates by switching to the sleep state again.

When the AP 210 transmits the beacon frame for the $2^{nd}$ time, since a medium is occupied (i.e., the medium is a busy medium) in a manner that another device accesses the medium for example, the AP 210 is unable to transmit the beacon frame to correspond to an accurate beacon interval but is able to transmit the beacon frame at a delayed timing point [S212]. In this case, although the STA1 220 switches its operating mode to the awake state to correspond to the beacon interval, since the STA1 220 fails in receiving the beacon frame transmitted by being delayed, the STA1 220 switches to the sleep state again [S222].

When the AP 210 transmits the beacon frame for the $3^{rd}$ time, TIM element set as DTIM may be contained in the corresponding beacon frame. Yet, since the medium is occupied (i.e., the medium is a busy medium), the AP 210 transmits a delayed beacon frame [S213]. The STA1 220 operates by switching to the awake state to correspond to the beacon interval and is able to acquire DTIM through the beacon frame transmitted by the AP 210. The DTIM acquired by the STA1 220 is assumed as indicating that there is no frame to be transmitted to the STA1 220 and that a frame for another STA is present. In this case, the STA1 220 confirms that there is no frame to receive and is then able to operate by switching to the sleep state again. After transmitting the beacon frame, the AP 210 transmits a frame to the corresponding STA [S232].

The AP 210 transmits the beacon frame for the $4^{th}$ time [S214]. Yet, since the STA1 220 is unable to acquire information, which indicates that a buffered traffic for the STA1 220 is present, through the 2 previous TIM element receptions, the STA1 220 is able to adjust a wakeup interval for the TIM element reception. On the other hand, if a signaling information for adjusting a wakeup interval value of the STA1 220 is contained in the beacon frame transmitted by the AP 210, the wakeup interval value of the STA1 can be adjusted. According to the present example, the STA1 220 can be set to switch an operating state in a manner that the STA1 220 wakes up once in every 3 beacon intervals instead of switching the operating state for the TIM element reception in every beacon interval. Hence, since the STA1 220 maintains the sleep state at the timing point at which the AP 210 transmits the beacon frame for the $5^{th}$ time [S215] after transmitting the $4^{th}$ beacon frame [S214], the STA1 220 is unable to acquire the corresponding TIM element.

When the AP 210 transmits the beacon frame for the $6^{th}$ time [S216], the STA1 220 operates by switching to the awake state and is able to acquire the TIM element contained in the beacon frame [S224]. Since the TIM element is the DTIM that indicates that a broadcast frame is present, the STA1 220 does not transmit a PS-Poll frame to the AP 210 but is able to receive a broadcast frame transmitted by the AP 210 [S234]. Meanwhile, a wakeup interval set for the STA2 230 can be set to have a period longer than that of the STA1 220. Hence, the STA2 230 can receive the TIM element by switching to the awake state at the timing point S215 at which the AP 210 transmits the beacon frame for the $5^{th}$ time [S241]. The STA2 230 recognizes that a frame to be transmitted to the STA2 230 is present from the TIM element and is then able to transmit a PS-Poll frame to the AP 210 to request a frame transmission [S241a]. Finally, the AP 210 is able to transmit a frame to the STA2 230 in response to the PS-Poll frame [S233].

For the power save mode management shown in FIG. 15, TIM element contains TIM indicating whether a frame to be transmitted to STA is present or DTIM indicating whether a broadcast/multicast frame is present. And, the DTIM can be implemented through a field setup of the TIM element.

Figure 16:
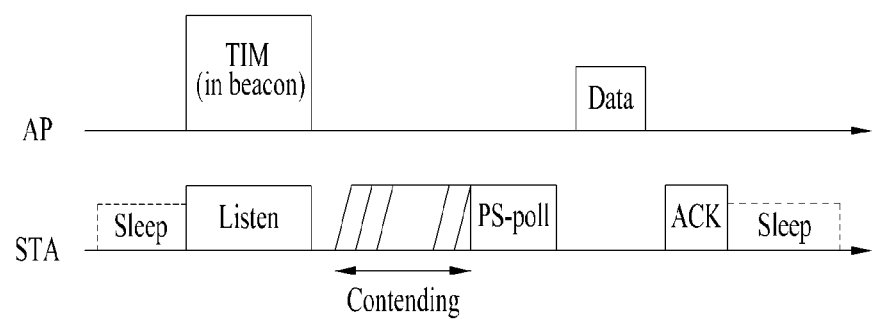
FIGS. 16 to 18 are diagrams to describe operations of an STA having received TIM in detail.
Figure 18:
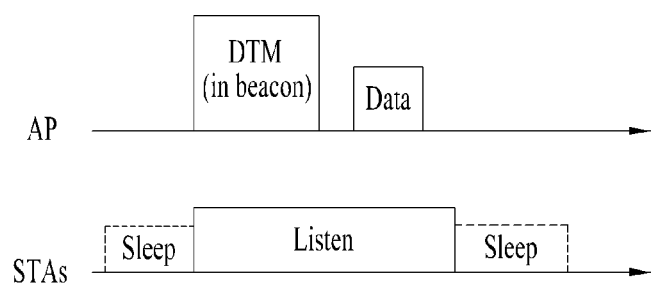

FIGS. 16 to 18 are diagrams to describe operations of an STA having received TIM in detail.

Referring to FIG. 16, an STA switches to an awake state from a sleep state in order to receive a beacon frame containing a TIM from an AP and is then able to recognize that there is a buffered traffic to be transmitted to the STA by interpreting the received TIM element. The STA performs contention with other STAs for a medium access for a PS-Poll frame transmission and is then able to transmit a PS-Poll frame to make a request for a data frame transmission to the AP. Having received the PS-Poll frame transmitted by the STA, the AP is able to transmit a frame to the STA. The STA receives a data frame and is then able to transmit an ACK frame to the AP in response to the received data frame. Thereafter, the STA can switch to the sleep state again.

Like the example shown in FIG. 16, an AP can operate by an immediate response scheme in a manner of receiving a PS-Poll frame from an STA and then transmitting a data frame after a lapse of a prescribed time (e.g., SIFS (short inter-frame space). Meanwhile, after the AP has received the PS-Poll frame, if the AP fails to prepare the data frame, which is to be transmitted to the STA, within the SIFS time, the AP is able to operate by a deferred response scheme. This is described with reference to FIG. 22 as follows.

Figure 21:
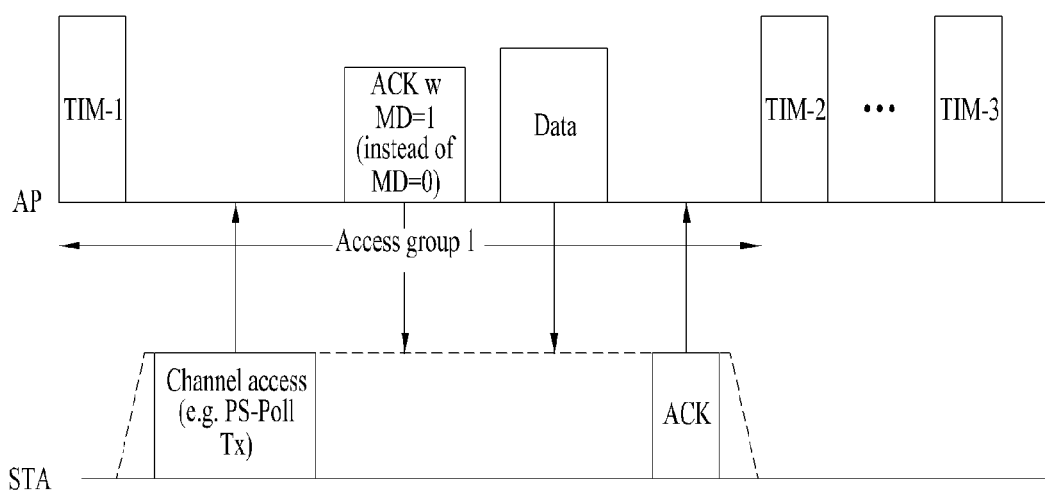
FIG. 21 and FIG. 22 are diagrams for examples of a channel access operation of an STA according to one embodiment of the present invention.

In an example shown in FIG. 17, like the former example shown in FIG. 21, an STA operates in a manner of switching to an awake state from a sleep state, receiving a TIM from an AP, and then transmitting a PS-Poll frame to the AP. If the AP fails to prepare a data frame during SIFS despite receiving the PS-Poll frame, the AP is able to transmit an ACK frame to the STA instead of transmitting the data frame. If the AP prepares the data frame after transmitting the ACK frame, the AP performs a contending and is then able to transmit the data frame to the STA. Subsequently, the STA transmits an ACK frame, which indicates that the data frame is successfully received, to the AP and is then able to switch to the sleep state.

FIG. 18 shows one example that an AP transmits a DTIM. Each of STAs can switch to an awake state from a sleep state in order to receive a beacon frame containing a DTIM element from an AP. Each of the STAs can be aware that a multicast/broadcast frame will be transmitted through the received DTIM. After the AP has transmitted the beacon frame containing the DTIM, the AP is able to immediately transmit data (i.e., multicast/broadcast frame) without a PS-Poll frame transceiving operation. Each of the STAs receives the data in the course of keeping the awake state after receiving the beacon frame containing the DTIM and is then able to switch to the sleep state again after completion of the data reception.

TIM Structure

In a power save mode managing method based on TIM (or DTIM) protocol described with reference to one of FIGS. 16 to 18, each of STAs can check whether a data frame, which will be transmitted for the corresponding STA, is present through STA identification information contained in TIM element. The STA identification information may include an information related to an AID (association identifier) assigned to the STA in the course of association with an AP.

The AID is used as a unique identifier for each STA in a single BSS. For instance, in a current WLAN system, the AID can be assigned as one of values ranging 1 to 2,007. In a currently defined WLAN system, 14 bits can be assigned to AID in a frame transmitted by an AP and/or STA and an AID value can be set to a value up to 16,383. Yet, 2,008 to 16,383 are set as reserved values.

TIM element according to an existing definition is not appropriate for applying an M2M application for associating a number of STAs (e.g., over 2,007 STAs) with a single AP. In case of extending an existing TIM structure as it is, since a TIM bitmap size increases to large, it cannot be supported by an existing frame format and is not appropriate for an M2M communication that considers an application of a low transmission rate. And, in the M2M communication, it is estimated that the number of STAs having a received data frame present in a single beacon period will be very small. Hence, considering the application example of the M2M communication, although a size of a TIM bitmap increases, since it is estimated that most of bits will have zero values frequently, a technology of compressing a bitmap efficiently is required.

As an existing bitmap compression technology, a method of defining an offset (or start point) value by omitting contiguous zeroes in a head part of a bitmap is prepared. Yet, although the number of STAs having buffered frames is small, if an AID value difference of each STA is big, compression efficiency is not high. For instance, in case that a frame, which is to be transmitted to two STAs respectively having AIDs set to 10 and 2,000, is buffered only, although a compressed bitmap has a length of 1,990, it has all zero values except both ends. In case that the number of STAs associable with a single AP is small, inefficiency of bitmap compression is not a big problem. Yet, if the number of STAs increases, such inefficiency may become a factor of degrading overall system performance.

In order to solve such a problem, data transmission can be performed effectively in a manner of dividing AID into several groups. In this case, a designated group ID (GID) is assigned to each of the groups. The AID assigned on the basis of group is described with reference to FIG. 19 as follows.

Figure 19:
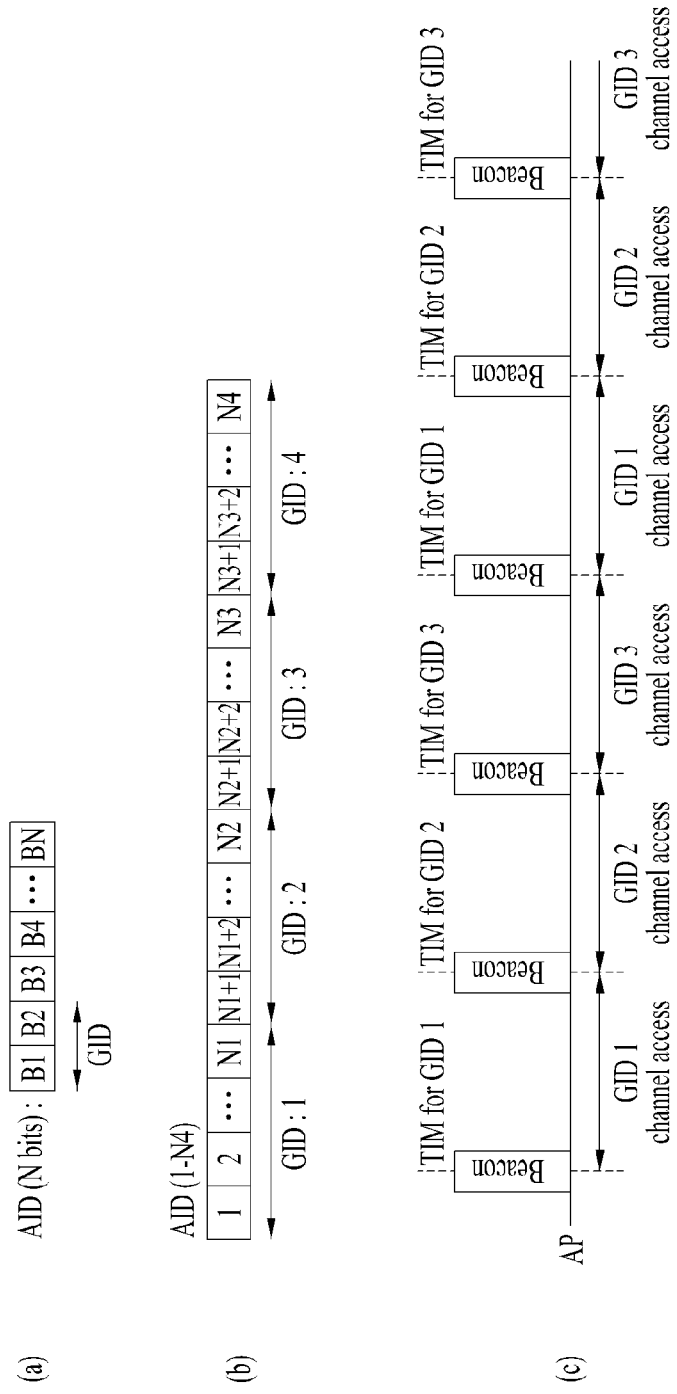
FIG. 19 is a diagram to describe a group based AID.

FIG. 19 is a diagram to describe a group based AID.

FIG. 19 (a) shows one example of AID assigned on the basis of group. In the example shown in FIG. 19 (a), several bits in a head part of AID bitmap can be used to indicate GID. For instance, it is able to indicate 4 GIDs using first 2 bits of the AID bitmap. If a total length of the AID bitmap is N bits, first 2 bits B1 and B2 indicate a GID of a corresponding AID.

FIG. 19 (b) shows another example of AID assigned on the basis of group. In the example shown in FIG. 19 (b), a GID can be assigned in accordance with a location of an AID. In this case, AIDs using the same GID can be represented as offset and length values. For instance, if GID 1 is represented as offset A and length B, it means that AIDs of A to (A+B−1) have GID 1 on a bitmap. For instance, in the example shown in FIG. 19 (b), assume that all AIDs 1 to N4 are divided into 4 groups. In this case, AIDs belonging to GID 1 are 1 to N1. And, the AIDs belonging to this group can be represented as offset 1 and length N1. AIDs belonging to GID 2 can be represented as offset (N1+1) and length (N2−N1+1). AIDs belonging to GID 3 can be represented as offset (N2+1) and length (N3−N2+1). AIDs belonging to GID 4 can be represented as offset (N3+1) and length (N4−N3+1).

If such a group-basis assigned AID is employed, a channel access is allowed in a time interval differing according to GID. Therefore, a shortage problem of TIM elements for a number of STAs can be solved and data can be efficiently transceived. For instance, a channel access is allowed for STA(s) corresponding to a specific group in a specific time interval, while the rest of STA(s) may be restricted from the channel access. Thus, a prescribed time interval for allowing an access for specific STA(s) only may be named a restricted access window (RAW).

A channel access according to GID is described with reference to FIG. 19 (c) as follows. FIG. 19 (c) shows one example of a channel access mechanism according to a beacon interval in case that AID is divided into 3 groups. A $1^{st}$ beacon interval (or a $1^{st}$ RAW) is an interval that allows a channel access for an STA corresponding to an AID belonging to GID 1 but does not allow a channel access for STAs belonging to other GIDs. In order to implement this, TIM element for AIDs corresponding to the GID1 only is contained in a $1^{st}$ beacon. TIM element for AIDs having GID 2 only is contained in a $2^{nd}$ beacon frame. Hence, a channel access of an STA corresponding to the AID belonging to the GID 2 is allowed in a $2^{nd}$ beacon interval (or a $2^{nd}$ RAW) only. TIM element for AIDs having GID 3 only is contained in a $3^{rd}$ beacon frame. Hence, a channel access of an STA corresponding to the AID belonging to the GID 3 is allowed in a $3^{rd}$ beacon interval (or a $3^{rd}$ RAW) only. The TIM element for AIDs having GID 1 only is contained in a $4^{th}$ beacon frame again. Hence, a channel access of an STA corresponding to the AID belonging to the GID 1 is allowed in a $4^{th}$ beacon interval (or a 4th RAW) only. Subsequently, in each of the following beacon intervals including a 5th beacon interval (or a 5th RAW), a channel access may be allowed only for STA belonging to a specific group indicated by a TIM contained in a corresponding beacon frame.

FIG. 19 (c) shows one example that an order of GID allowed according to a beacon interval is cyclic or periodic, by which the GID order is non-limited. In particular, an operation can be performed in a following manner. First of all, in a manner that that AID(s) belonging to specific GID(s) is contained in a TIM element (hereinafter named 'a separated TIM operation), a channel access is allowed only for STA(s) corresponding to the specific AID(s) in a specific time interval (e.g., a specific RAW) while the channel access is not allowed for the rest of STA(s). So to speak, an information indicating whether an AP instructs data buffering to STAs of an access group by a specific TIM may be limited to the access group by the corresponding TIM.

The group based AID assignment system mentioned in the above description may be named a hierarchical structure of TIM. In particular, a whole AID space is divided into a plurality of blocks and a channel access may be allowed only for STA(s) (i.e., STA of a specific group) corresponding to a specific block having a non-zero value. Hence, an STA can easily maintain TIM information by dividing a TIM in large size into small blocks/groups and the management of the blocks/groups in accordance with a class, QoS (quality of service) or usage of STA is facilitated. In the example shown in FIG. 19, 2-level layer is illustrated. Yet, it is able to configure a TIM of a hierarchical structure having at least two or more levels. For instance, a whole AID space is divided into a plurality of page groups, each of the page groups is divided into a plurality of blocks, and each of the locks can be divided into a plurality of subblocks. In this case, as an extension of the example shown in FIG. 24 (a), an AID bitmap can be configured in a following manner. First of all, first N1 bits indicate a page ID (i.e., PID), next N2 bits indicate a block ID, next N3 bits indicate a subblock ID, and the rest of bits indicate an STA bit location in a subblock.

Meanwhile, an STA is able to acquire information on TIM element (e.g., TIM for GID 1, TIM for GID 2, TIM for GID 3, etc.) discriminated per group mentioned in the above description from a normal beacon (e.g., a DTIM beacon, a long beacon, etc.) transmitted by long period [not shown in FIG. 19]. For instance, While an STA is performing a process for association with an AP, the STA acquires information (e.g., transmission period/length of the TIM element discriminated per group, a slot time in each group access interval, etc.) on TIM element discriminated per group from a beacon transmitted by long period and is then able to receive a corresponding TIM element by switching to an awake state in a period in which the corresponding TIM element of the group having the corresponding STA belong thereto is transmitted. Such a TIM element discriminated per group can be named a TIM segment.

To examples of the present invention mentioned in the following description, various methods of dividing STAs (or AIDs respectively assigned to STAs) by prescribed hierarchical group unit and managing the STAs are applicable, by which the group based AID assignment method may be non-limited.

Improved Channel Access Scheme

In case that AID is assigned/managed based on a group, STAs belonging to a specific group can use a channel in 'group channel access interval' (or RAW) assigned to the corresponding group only. In this case, an AP broadcasts that data of a specific STA exists in a buffer through a TIM bitmap indication, whereby STAs included in a TIM bitmap can be aware that their own data are standing by in the buffer and wait for data receptions.

In case that an STA supports an M2M application, a traffic for the corresponding STA may be characterized in being generated by a long period (e.g., several tens of seconds, several hours, etc.). Since such an STA does not need to maintain an awake state frequently, it is preferable that the STA operates in sleep mode for a long time and enters an awake state occasionally (i.e., a wakeup interval of the corresponding STA is set long). Thus, an STA having a wakeup interval of a long period can be called an STA operating in long-sleeper' or long-sleep' mode. Yet, the cause of setting a wakeup period to be long is non-limited for the purpose of an M2M communication. And, a wakeup interval can be set to be long for a general WLAN operation depending on an state of an STA, an ambient situation of an STA or the like.

Once a wakeup interval is set, an STA is able to determine whether the wakeup interval elapses based on a local clock of the STA. Yet, since the local clock of the STA is generally used by an inexpensive oscillator, it is highly probable that a margin of error exists. Moreover, if the STA operates in the long-sleep mode, the error may increase more as time elapses. Hence, a time synchronization of an occasionally waking-up STA may not coincide with a time synchronization of an AP. For instance, although an STA enters an awake state by calculating its timing of receiving a beacon, the STA may not be able to receive a beacon actually transmitted by an AP at the corresponding timing. In particular, an STA may miss a beacon frame due to a clock drift. In case that the STA operates in long-sleep mode, such a problem may be caused frequently.

Moreover, there may exist a vacant time slot as well as a time slot for receiving downlink data by STA(s) indicated by a TIM element in a single access group interval or a time slot for transmitting a PS-Poll frame for checking or verifying a presence of data buffered in an AP by STA(s) indicated by a TIM element. In this case, there may exist STAs failing to belong to a corresponding group to which the STAs intend to transmit their data during the vacant time slot. For instance, STAs failing to have association with an AP may attempt channel accesses for random uplink data transmissions. When an STA among STAs having checked a beacon or TIM information carried on the beacon does not belong to an access available group in a corresponding interval, if a standby time (latency) to an access available interval of the corresponding STA is too long or the corresponding STA determines that a load (i.e., the number of STAs having downlink data indicated by a TIM) of an access group indicated by a TIM checked by the corresponding STA is sufficiently small, the corresponding STA is able to transmit uplink data in such a special situation as an emergency data transmission, a power outage and the like, an STA can randomly transmit a PS-Poll frame or uplink data.

In doing so, an AP can perform an access control of the above-described STA(s) as well as an access control on PS-Poll transmission of group STA(s) capable of a channel access in a corresponding interval. For instance, a channel access can be temporarily allowed to the above-described STA(s) by utilizing the rest of space in a TIM bitmap transmitted for scheduling a PS-Poll frame transmission of a corresponding group except a part set to 1. In this case, a location of a bit set to 1 in a bitmap field of a TIM element means that a timing point (or a time slot) related to the corresponding bit location is designated as a channel access interval to a corresponding STA, and both an uplink and a downlink or a downlink only may be related to the bit location. For instance, in case that both an uplink and a downlink are related, an STA corresponding to a bit set to 1 in a bitmap field can receive a buffered downlink data saved in an AP in a designated channel access interval or can transmit its own uplink data to the AP. On the other hand, if a downlink is related only, an STA corresponding to a bit set to 1 in a bitmap field can only receive a buffered downlink data saved in an AP in a designated channel access interval. The method according to the present invention is applicable to the two kinds of situations.

Figure 20:
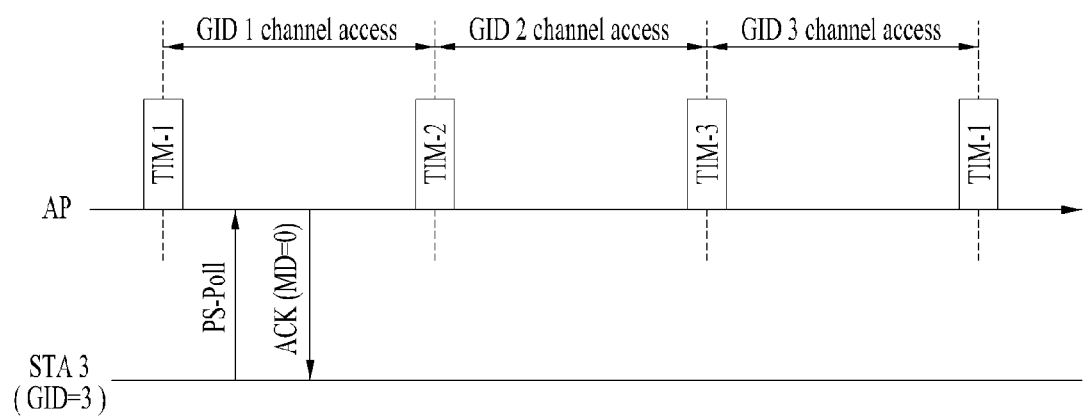
FIG. 20 is a diagram for examples of an operation of an STA in case of configuring a group channel access interval.

FIG. 20 is a diagram for examples of an operation of an STA in case of configuring a group channel access interval.

In the example shown in FIG. 20, an STA 3, which is an STA belonging to a group 3 (i.e., GID=3), wakes up in a channel access interval assigned to a group 1 (i.e., GID=1) and is the able to perform PS-Poll for requesting an AP to perform a frame transmission.

According to a related art, in case that a buffered data of an STA belonging to a TIM carried on a beacon exists in an AP, it is transmitted in a manner of being set as 'MD=1'. Yet, in the separated TIM operation mode mentioned in the foregoing description, it can be applied in a manner of being subdivided into a presence or non-presence of a buffered data in a group access interval of a corresponding TIM. In particular, since an indication information on an STA belonging to a specific group is included in a TIM element, in case that an STA does not belong to a corresponding group (i.e., an STA is not indicated by a corresponding TIM element), although a buffered data for the corresponding STA is present in an AP, it is able to transmit an information indicating that a data to be data is not present. In FIG. 20, having receives a PS-Poll from an STA 3, an AP can provide an information indicating that a data to be transmitted to the STA 3 is not present in an interval, which is not allowed for a channel access of the STA 3, despite decoding the PS-Poll successfully through an ACK frame. For instance, the AP is able to transmit the ACK frame, in which an MD (more data) subfield is set to 0 (i.e., MD=0), to the STA 3.

Besides, an STA failing to belong to a corresponding group may transmit an uplink data to an AP (not shown in FIG. 20). For instance, in FIG. 20, the STA 3 is able to randomly transmit an uplink data to the AP in a channel access interval assigned to the group 1.

For these cases, an AP informs an STA of a time information of an interval, in which a channel access of the corresponding STA is allowed, and the like so that the corresponding STA can attempt a channel access by keeping time with the interval in which the channel access of the corresponding STA is allowed. For instance, in FIG. 20, a timing point at which the STA 3 transmits a PS-Poll belongs to a channel access interval for the group 1, the AP does not transmit data right after ACK frame transmission despite a presence of the data to be transmitted to the STA 3 but transmits the data to the STA 3 in a channel access interval assigned to the group 3 by informing a time information on the channel access interval (GID 3 channel access) assigned to the group 3 having the STA 3 belong thereto.

Yet, in one of a case that the number of channel access groups is high, a case that a time taken for an STA to arrive at an interval, in which a channel access of the STA is allowed, is long, and a case that an AP detects a situation that channel accesses of STAs belonging to a channel access group of the corresponding STA may be concentrated, a simple action of informing an interval available for a channel access of the corresponding STA may be insufficient to support efficient channel access management between the AP and the STA. For instance, a specific STA may persistently experience a situation that a time taken to stand by until a channel access of the specific STA is too long. After STAs in an access group other than a group of the specific STA have transmitted PS-Polls or data to an AP, channel accesses of the STAs are restricted. If channel accesses are concentrated due to a delay of a specific access group, overall channel access control may become inefficient.

To solve the above problems, the present invention proposes an STA's channel access method. In particular, the present invention proposes a method for an AP to allow a channel access of an STA irregularly in a channel access interval (or a multi-TIM based channel access interval surpassing a single TIM based channel access interval, a predefined or signaled specific time interval) based on a TIM assigned to a different group other than a group to which the corresponding STA belongs in a separated TIM operation mode supportive environment. By the proposed method, an operation for a specific STA to perform a channel access in a different channel access group to which the specific STA does not belong or in a different channel access interval shall be simply named an access group overriding or an overriding/overloading. STA(s) of which downlink data is indicated by a single TIM element shall be named an access group, and an interval for allowing a specific access group to perform a channel access can be called an access group interval or a group access interval.

FIG. 21 is a diagram for one example of a channel access operation of an STA according to one embodiment of the present invention.

Referring to FIG. 21, although an STA is an STA not belonging to a group 1 (i.e., an STA belong to an access group 2 or an access group 3) by a TIM indication, an AP allows a channel access of the STA in an access group interval of the group 1.

In order to check whether a data to be transmitted to the STA by the AP is present in a buffer in an interval (i.e., an access group 1 interval) other than an access group interval assigned to the access group to which the STA belongs, the STA can transmit a frame (e.g., a PS-Poll frame) for a channel access to the AP. In this case, the STA not corresponding to the access group 1 may include an STA failing to have an association with the corresponding AP or an STA failing to belong to the access group 1 despite having the association. In other words, an AID is not currently assigned to the STA by the AP due to the absence of the association with the corresponding AP and an AID belonging to an access group other than the access group 1 may be assigned to the STA.

Although an STA attempting a channel access is an STA failing to belong to the access group 1, the AP can temporarily allow the corresponding STA to perform the channel access depending on a state of a network (e.g., a case that a channel access load on an access group belonging to TIM-1 is not heavy, a case that the TIM-1 has a margin of a space (e.g., AID) of an operable STA, etc.).

Thus, when a channel access of a corresponding STA is temporarily allowed, if an AP having successfully received a channel access frame of the corresponding STA stores a buffered data to transmit to the corresponding STA, the AP can provide an information (i.e., an information indicating that an overriding is allowed and that a data to be transmitted is present) indicating it through a response frame in repose to the channel access frame. For instance, the AP transmits an ACK frame as a response message and is able to indicate the information in a manner of setting a value of 1-bit MD (more data) subfield included in the ACK frame to 1 (i.e., MD=1). Having received such a response message, the STA waits by performing CCA until receiving data transmitted by the AP. After the STA has received the data from the AP, the STA can transmit a response message (e.g., an ACK frame) to the AP in response to the received data. In particular, if the AP is ready to transmit the buffered data to transmit to the corresponding STA, the AP transmits the data to the corresponding STA. Subsequently, the STA is able to perform a decoding by checking a data frame forwarded to the corresponding STA through a preamble of the data frame detected through the CCA.

On the other hand, if an AP does not allow an overriding of an STA having transmitted a channel access frame (and, simultaneously, does not store a buffered data to transmit to the corresponding STA), the AP can transmit an information indicating it (i.e., the overriding is not allowed and the data to be transmitted is not present) through a response message. For instance, it is able to indicate such information in a manner of setting a value of 1-bit MD (more data) field included in an ACK frame to 0 (i.e., MD=0).

Moreover, an STA is able to transmit an uplink data to an AP in an access group interval of an access group to which the STA does not belong. This is described with reference to FIG. 22 as follows.

Figure 22:
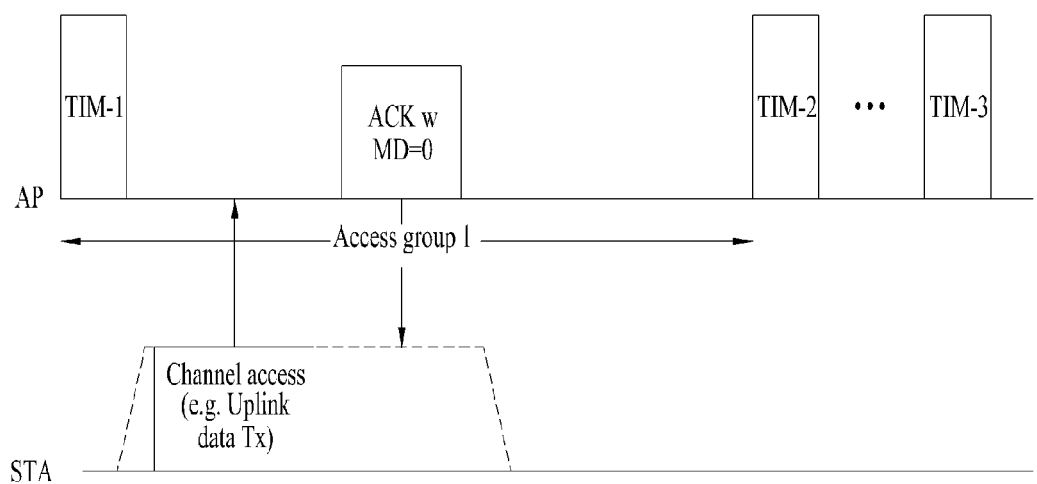

FIG. 22 is a diagram for one example of a channel access operation of an STA according to one embodiment of the present invention.

Referring to FIG. 22, although an STA is an STA not belonging to an access group 1 (i.e., an STA belong to an access group 2 or an access group 3) by a TIM indication, an AP allows a channel access of the STA in an access group 1 interval.

If the STA has an uplink data to transmit to the AP in an interval (i.e., access group 1 interval) other than an access group interval assigned to an access group to which the STA belongs, the STA is able to transmit a frame (i.e., an uplink data frame) for a channel access to the AP. In other words, if an uplink data to be transmitted to the AP is generated, the STA can transmit an immediate uplink data to the AP. If the STA failing to correspond to the access group 1 may include an STA failing to have an association with the corresponding AP or an STA failing to belong to the access group 1 despite having the association. So to speak, since the STA does not have the association with the corresponding AP, an AID is not currently assigned to the STA by the AP. And, the STA may include an STA belonging to an access group other than the access group 1.

Although the STA attempting the channel access is an STA failing to belong to the access group 1, if the AP successfully receives an uplink data frame from the corresponding STA, the AP can transmit a response frame (e.g., an ACK frame) in response to an uplink data to the corresponding STA.

Thus, after an STA has transmitted an uplink data to an AP at a timing point other than an access group interval of a group to which the STA belongs, the AP can transmit a response frame in response to the data of the corresponding STA in a manner that information indicating a presence or non-presence of the overriding allowance and/or a presence of data to be transmitted in case of a presence of a buffered data to be transmitted to the corresponding STA by the AP is included in the response frame.

First of all, an AP newly defines bit(s) included in a frame control field of a response frame for an STA and is then able to provide such information (i.e., a presence or non-presence of the overriding allowance). For instance, it is able to reuse 1 bit (e.g., bit of a PM (power management) subfield) of a frame control field of an ACK frame for a data transmitted by the STA. In doing so, if the PM bit is set to 0, the corresponding STA is able to perform a channel access in an overriding allowed interval. On the other hand, if the PM bit is set to 1, the corresponding STA is unable to perform a channel access until receiving a beacon frame (e.g., a beacon frame including a TIM element for a next group). In doing so, an information indicated by a value of 0 and an information indicated by a value of 1 can be set to the contrary. Meanwhile, the overriding allowed interval of the STA shall be described later.

Moreover, an AP is able to provide information indicating a presence or non-presence of the overriding allowance and a presence of data to be transmitted to an STA by combining two bits included in a frame control field of a response frame for the corresponding STA. For instance, it is able to provide such information by combining two 1-bits (e.g., PM bit and MD (more data) bit) of a frame control field of an ACK frame for a data transmitted by the STA. In particular, if PM=0 and MD=0, it indicates that an STA is able to perform an uplink channel access and that a buffered frame to be transmitted to the corresponding STA is not present in an AP. In this case, the STA is able to transmit an uplink data to the AP in an indicated overriding allowed time. If PM=0 and MD=1, it indicates that an STA is able to perform an uplink channel access and that a buffered frame to be transmitted to the corresponding STA is present in an AP. In this case, the STA may wait for a reception of data (or a response frame) for the indicated overriding allowed time. Alternatively, the STA transmits an uplink data to the AP again in the overriding allowed time or may transmit a PS-Poll frame for a downlink data reception to the AP. If PM=1 and MD=0, it indicates that an STA is unable to perform an uplink channel access and that a buffered frame to be transmitted to the corresponding STA is not present in an AP. If PM=1 and MD=1, it indicates that an STA is unable to perform an uplink channel access and that a buffered frame to be transmitted to the corresponding STA is present in an AP. In this case, although data to be received by the corresponding STA in downlink is included in the buffer, it may include a situation that the STA is unable to transmit a PS-Poll frame to the AP. In particular, it may mean an indication that the AP does not transmit data in a current round (i.e., a current access group interval) under the determination on a channel access load in a current access group interval. In this case, the settings of the bit values of the PM and MD for each case supported by a system can be applied in a manner of changing the above-mentioned order differently. In particular, the information indicated by the bit values 0 and 1 of the PM can be set to the contrary. And, the information indicated by the bit values 0 and 1 of the MD can be set to the contrary as well. Moreover, although the PM bit is taken as an example for clarity of the description, it is able to indicate a presence or non-presence of uplink channel accessibility by redefining a random bit in a response frame as well as the PM bit. For instance, it is able to indicate a presence or non-presence of uplink channel accessibility by redefining a random bit of a frame control field or a random bit of a PLCP SIG field.

In the examples shown in FIG. 21 and FIG. 22, if an STA attempts an overriding on a group to which the STA does not belong, the corresponding STA can transmit a request frame for requesting an overriding (or an allowance for the overriding) to an AP together with or instead of a frame (e.g., a PS-Poll or an uplink data frame) for a channel access. For instance, in such a special situation as an emergency, a power outage and the like, an STA is able to transmit a request frame to an AP. For example, a frame (e.g., a PS-Poll or an uplink data frame) for a channel access may include an information indicating whether an overriding (or an allowance for the overriding) is requested. Through this information, an AP is able to check whether the frame for the channel access requests the overriding. A control (or management) frame of a new subtype is defined in a frame control field of an existing frame for a channel access, thereby indicating a presence or non-presence of an overriding request. Alternatively, a frame control field can indicate a presence or non-presence of an overriding request through a PM (power management) field. For instance, if a PM field is set to 1, a corresponding frame for a channel access can be used as a frame for requesting an overriding together. Alternatively, a signaling field indicating a presence or non-presence of an overriding request can be included in an SIG field. Alternatively, unlike the signaling field, a new frame format for requesting an overriding is defined instead of a frame (e.g., a PS-Poll or an uplink data frame) for a channel access, whereby an STA is able to request an access group overriding to an AP.

Moreover, in the examples shown in FIG. 21 and FIG. 22, after an STA has completed a data reception (cf. FIG. 21) from an AP or a data transmission to (cf. FIG. 22) to the AP [i.e., the STA has performed an overriding], the STA determines that its own channel access is allowed in a temporarily overriding allowed access group interval or a corresponding access group interval, thereby being able to attempt a channel access through another PS-Poll or transmit an uplink data to the AP in the corresponding interval. Hence, in order to prevent such a reckless channel access attempt of an STA, an AP can configure an overriding allowed interval for the overriding STAs. In this case, the overriding allowed interval can be configured in a manner of being limited within an access group interval of a corresponding TIM, in which the STA has performed the overriding. Alternatively, it is able to configure the overriding allowed interval by extending it to a multiple access group interval. For instance, in FIG. 21 and FIG. 22, an overriding allowed interval can be configured in a manner of being extended to an access group interval. Alternatively, an overriding allowed interval can be configured in a manner of being extended to a specific time pre-defined or signaled by a system.

An AP can inform an STA of an information on an overriding allowed interval through a specific field in a response frame in response to a channel access frame received from an STA. In this case, the information on the overriding allowed interval can designate a start timing point and/or an end timing point of an interval for allowing an overriding. For instance, in case that a start timing point and an end timing point are designated, an interval between the designated start timing point and the designated end timing point can correspond to an overriding interval. Moreover, if a start timing point is designated only, an interval between the designated start timing point and an end timing point of an access group interval of a corresponding TIM can correspond to an overriding allowed interval. If an end timing point is designated only, an interval between a reception of a response frame including the corresponding information and the designated end timing point can correspond to an overriding allowed interval.

For instance, an AP can information an STA of an information on an overriding allowed interval by utilizing a duration field in an ACK frame transmitted in response to a channel access frame received from the STA. For instance, the AP is able to inform the STA of the information as a value of a microsecond (µs) unit (or multiple integer), a basic slot time (e.g., a slot time for a backoff counting) defined by a system, or a symbol unit in a duration field included in a MAC header of an ACK frame. In this case, the AP can inform the STA of the information on the overriding allowed interval within a 2-octet size without changing a size of a duration field in an existing MAC header.

Thus, in case that a duration field of an ACK frame is used differently, an AP can inform an STA of an information (e.g., an information on an overriding allowed interval, an informa-tion indicating a presence or non-presence of a new ACK frame, etc.) indicating that the duration field of the ACK frame is applied differently. For instance, it is able to indicate that a duration field of a corresponding ACK frame is a field indicating an overriding allowed interval by defining a control (or management) frame of a new subtype in a frame control field. Alternatively, it is able to indicate that a duration field is a field indicating an overriding allowed interval through a power management (PM) field in a frame control field. For instance, if a PM field is set to 1, it is able to define a duration field of a corresponding ACK frame to be used as a proposed overriding access offset value only. Alternatively, a signaling field indicating a type (or another usage) of an ACK frame can be included in an SIG field.

Alternatively, unlike the above description, it is able to provide an STA with an information on an overriding allowed interval by defining a new response frame format. In this case, a response frame transmitted by an AP can include an RA (receiver address) or AID information of an STA, which has transmitted a frame (e.g., a PS-Poll or uplink data frame) for a channel access, a frame control field, an FCS field and an information on an overriding allowed interval. In this case, the transmitted AID information of a user equipment may include an AID information in a newly assigned (reassigned) instead of an AID information previously assigned to an STA. The reassigned AID information may be valid in an overriding allowed interval only.

Meanwhile, in a system in which a channel access scheme (or order) of an STA is operated in association with an information (e.g., an AID information associated with an indication belonging to a TIM element, an STA belonging bit location in a TIM element, the number of STAs belonging to a TIM element (e.g., the number of STAs having a bit set to 1 and/or the number of STAs having a bit set to 0, etc.), an information associated with PID, etc.) of a TIM (such a system can be named a deterministic access way), a channel access timing point (e.g., a timing point of transmitting a PS-Poll frame or an uplink data) of every STA belonging to a corresponding TIM may be determined in advance.

Figure 23:
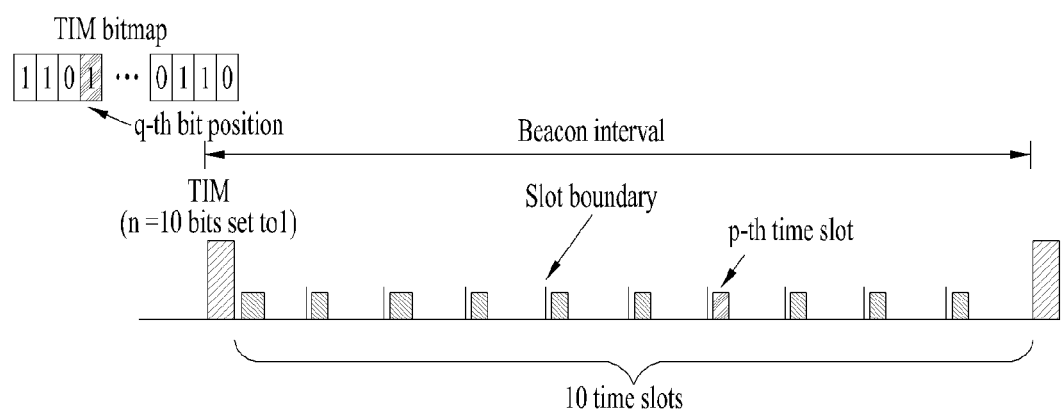
FIG. 23 and FIG. 24 are diagrams for examples of a channel access timing point of an STA in accordance with a deterministic access way.

FIG. 23 is a diagram for one example of a channel access timing point of an STA in accordance with a deterministic access way.

Referring to FIG. 23, an access time slot of an STA indicated by a TIM element included in a beacon frame may be determined in a manner of being fully spread during a beacon interval. In particular, times of access time slots of all STAs set as 1 bit in a bitmap of the TIM element can configure a full beacon interval. In this case, in accordance with a bit location (or an AID related to this) of an STA in a bitmap included in a TIM element, a channel access time of the corresponding STA can be determined in an interval of a beacon including the corresponding TIM element. For instance, a channel access timing point can be mapped to a function related to a bit location (or a location of STA) in a bitmap of a TIM element. For instance, in FIG. 23, a $p^{th}$ time slot means an actual access time slot of an STA related to a location of a bit q in a bitmap of a TIM element. In this case, the $p^{th}$ time slot in which the STA actually performs a channel access can be mapped to a bit q using a specific permutation function. For instance, such a function can be determined as a function of parameters including the number of all STAs covered by a TIM element (i.e., belonging to a bitmap in the TIM element), the number of STAs set to 0 or 1 in the TIM element, a slot time and the like. In FIG. 23, access time slots of STAs having a bit set to 1 are fully spread during a beacon interval. Yet, as a length of a time slot is set smaller than that of the example shown in FIG. 23, access time slots are not fully spread, access time slots of STAs having bit set to 1 are determined in order from a start point of a beacon interval, and the remaining beacon interval may be configured.

Figure 24:
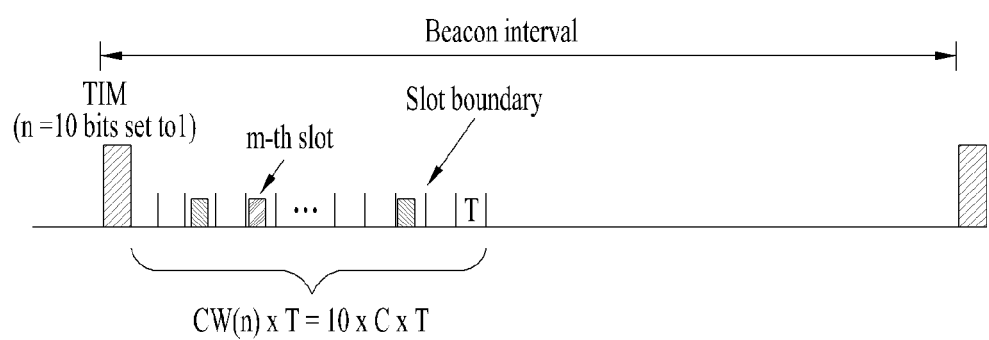

FIG. 24 is a diagram for another example of a channel access timing point of an STA in accordance with a deterministic access way.

Referring to FIG. 24, access time slots for STAs set to 1 in a bitmap of a TIM element included in a beacon frame are not fully spread during a beacon interval, but one portion of the beacon interval can be set as a channel access interval of a corresponding STA. In particular, an STA in a group set to 1 in a bitmap of a TIM element can perform a channel access to an AP in a contention window (CW). In this case a size CW(n) of the contention window (CW) can be determined in association with the number of bits (i.e., the number of STAs) set to 1 in the bitmap of the TIM element and may be determined as FIG. 23 in advance for example. In this case, the n indicates the number of bits set to 1 in the TIM element, the CW(n) indicates a size of CW applied to an interval of a beacon in which the number of bits set to 1 in the TIM element has a value of n, and the T indicates a slot time.

Thus, in case that channel access times (e.g., a timing point of transmitting a PS-Poll frame or an uplink data) of all STAs belonging to a corresponding TIM are determined in advance, if a random STA failing to belong to the corresponding TIM transmits a channel access frame at a random timing point, it may affect the rules applied to the above-mentioned deterministic access way to support an overriding of the corresponding STA. In order to settle it, the following method may apply.

To a channel access scheme in a system supportive of a deterministic access way mentioned in the following description, the former channel access scheme mentioned in the foregoing description may apply identically as well as a deterministic access way.

Figure 25:
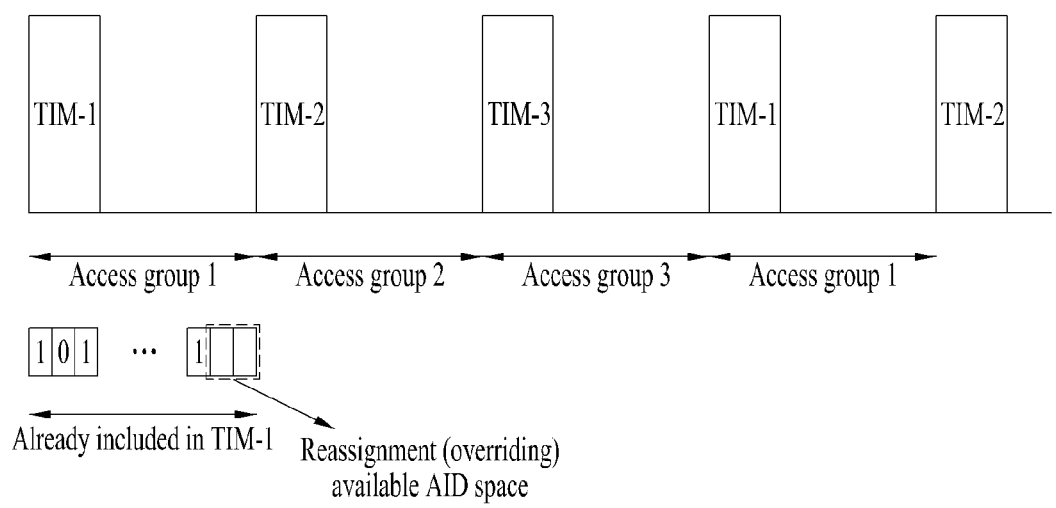
FIGS. 25 to 29 are diagrams for examples of a channel access operation of an STA according to one embodiment of the present invention.

FIG. 25 is a diagram for one example of a channel access operation of an STA according to one embodiment of the present invention.

Referring to FIG. 25, an AP is able to assign bits to random STA(s) (i.e., overriding STA(s)) failing to belong to a corresponding access group using an available bitmap space (or an available AID space) in a bitmap of a corresponding TIM.

First of all, an AP can control random STAs, which fail to belong to an access group indicated by a corresponding TIM, to be included from a location of a bit next to a bit for a last STA having a presence (i.e., bit=1) of a buffered data in a full bitmap field of the corresponding TIM. In particular, it is able to only consider STAs paged (i.e., bit=1) in order to determine a channel access timing point for a random STA failing to belong to an access group indicated by a corresponding TIM.

Moreover, when a channel access timing point of an overriding STA is determined to secure channel accesses (e.g., performing PS-Poll) of STAs performing overriding operations or to prevent unnecessary collisions between STAs belonging to a corresponding access group and the overriding STAs, it is able to determine the channel access timing point of STAs failing to belong to the corresponding access group in consideration of a part set to 0 in a TIM bitmap without considering the number set to 1 in the TIM bitmap. If the number of STAs belonging to the corresponding access group is smaller than the number (i.e., the bit number of a bitmap that can be indicated by the corresponding TIM) of STAs supportable by a corresponding TIM, an AP is able to assign the remaining available bit(s) in a whole bitmap to the STA(s) failing to belong to the corresponding access group. Alternatively, by pre-reserving access opportunity (or timing point) available for STAs that perform an overriding in part, the AP may not assign bit (i.e., AID) to STAs belonging to the corresponding access group at a corresponding bit location (access opportunity) indicating a pre-reserved interval for an overriding STA. Thus, by pre-reserving a specific access timing point for an overriding STA, it is able to prevent unnecessary collision between STAs performing the channel access on the basis of a TIM bitmap and STAs not performing the channel access. In doing so, an AP can control random STAs, which do not belong to an access group indicated by a corresponding TIM, to be included from a location of a bit next to a bit for all STAs (e.g., STA having a presence (bit=1) or non-presence (bit=0) of a buffered data) belonging to the corresponding group in a while bitmap field of the corresponding TIM. In particular, in order to determine a channel access timing point for a random STA failing to belong to an access group indicated by a corresponding TIM, it is able to consider all STAs belonging to the corresponding group. In the example shown in FIG. 25, in consideration of all STAs belonging to an access group 1 indicated by TIM 1, bit is assigned to random STA(s), which fails to belong to the access group 1, from a location next to the bit for all STAs of the access group 1.

Thus, by assigning specific bit to a random STA failing to belong to an access group indicated by a corresponding TIM in a bitmap field of the TIM, it is able to determine channel access timing point of random STAs from a location of bit indicating the random STA. In doing so, the channel access timing point of the corresponding random STAs can be mapped to a location of the bit related to the random STA using a specific permutation function.

In this case, an AP is able to temporarily assign (or reassign) AID corresponding to an available bitmap space in order that each of the random STAs failing to belong to the access group indicated by the TIM can perform a channel access without affecting channel accesses of other STAs belonging to the corresponding group. Information on the assigned (reassigned) AID can be transmitted in a manner that the AP transmits information of AID to an overriding STA in direct. In particular, as an information on an interval for allowing a channel access of an STA failing to belong to a group indicated by a TIM, it is able to transmit an AID related to a bit assigned to an STA failing to belong to the corresponding group among bits other than the whole bit (0 or 1) indicating an STA belonging to the corresponding group in a TIM bitmap. Moreover, the AP can transmit an AID related to a bit assigned to an STA failing to belong to a corresponding group among bits located next to a last bit set to 1 in a bitmap of a TIM. Moreover, the AP can directly transmit an information on a channel access timing point in order that each of random STAs failing to belong to an access group indicated by a TIM can perform a channel access. In particular, the AP can transmit an information on a channel access timing point related to a bit assigned to an STA failing to belong to the corresponding group to the corresponding STA. In this case, the channel access timing point of each of the STAs failing to belong to the access group indicated by the TIM can be called an overriding access time. In particular, the AP can transmit an information on an overriding access time, which is determined from a bit location of a bitmap assigned to an overriding STA failing to belong to the access group indicated by the TIM, to the corresponding STA. It is able to transmit the information on AID or the overriding access time information using a response frame (e.g., an ACK frame, a newly defined response frame, etc.) in response to a channel access frame (e.g., a PS-Poll frame, an uplink data frame, etc.) of the overriding STA. For instance, an STA performing an overriding transmits a PS-Poll frame and is able to receive an ACK frame including an information on an AID or an overriding access time information. In doing so, the overriding STA does not wait for a data transmission from an AP in direct. Instead, the overriding STA stands by to correspond to the channel access timing point or the overriding access time information in accordance with the AID information transmitted by the AP and then receives data from the AP. In this case, since the description of the response frame is as good as the foregoing description, details of the response frame shall be omitted from the following description.

A pre-reserved interval or access opportunity of an overriding STA is non-limited by an available last location of a bitmap in a TIM like the example shown in FIG. 25. Optionally, every channel access timing point associated with a location set to 0 can be used for an overriding STA, which is described with reference to FIG. 26. In this case, the number of pre-reserved interval and access opportunity can be determined as a parameter of a quantity (i.e., the number of STA having no buffered data) set to 0. On the contrary, the number of pre-reserved interval and access opportunity can be determined as a parameter of a quantity (i.e., the number of STA having buffered data) set to 1.

Figure 26:
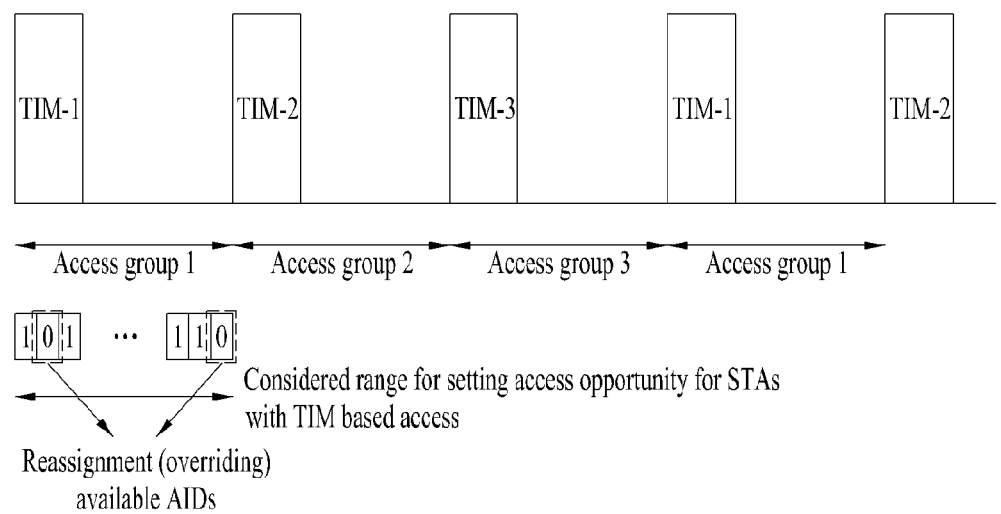

FIG. 26 is a diagram for one example of a channel access operation of an STA according to one embodiment of the present invention.

Referring to FIG. 26, a bit of a TIM bitmap can be set to 0 for an STA having no buffered data among STAs belonging to an access group indicated by a TIM [e.g., a $2^{nd}$ location of a TIM bitmap in the example shown in FIG. 25, $2^{nd}$ and last locations of a TIM bitmap in the example shown in FIG. 26]. In this case, every channel access timing point associated with a bit location set to 0 in a bitmap within a TIM can be used for an overriding STA. And, an AP is able to assign corresponding bit(s) to the overriding STA in consideration of a bit location set to 0 due to a non-presence of a buffered data as well as an available bitmap space (in case of presence) in a bitmap of a corresponding TIM. Hence, each STA attempting an overriding is able to transmit a channel access frame (e.g., a PS-Poll frame, an uplink data frame, etc.) to an AP at a channel access timing point determined by a bit location set to 0. In doing so, if a plurality of overriding STAs exist, a corresponding access opportunity can be obtained by contention (e.g., random back-off).

If each STA attempting an overriding does not transmit a channel access frame at a timing point corresponding to a bit location set to 0 but transmits a channel access from to an AP at a random timing point, the AP is able to directly assign a vacant access opportunity (i.e., bit set to 0 due to a non-presence of a buffered data) to the overriding STA. In particular, the AP can temporarily assign (reassign) an AID corresponding to an access opportunity (i.e., bit set to 0 due to a non-presence of a buffered data) in order that each of random STAs failing to belong to an access group indicated by a TIM can perform a channel access without affecting channel accesses of other STAs belonging to the corresponding group. Information on the assigned (reassigned) AID can be transmitted in a manner that the AP transmits information of AID to an overriding STA in direct. In particular, as an information on an interval for allowing a channel access of an STA failing to belong to a group indicated by a TIM, it is able to transmit an AID related to a bit assigned to an STA failing to belong to the corresponding group among bits not set to 1 in a TIM bitmap. Moreover, the AP can directly transmit an information on a channel access timing point in order that each of random STAs failing to belong to an access group indicated by a TIM can perform a channel access. In particular, the AP can transmit an information on an overriding access time, which is determined from a bit location (i.e., a bit location set to 0 due to a non-presence of a buffered data) of a bitmap assigned to an overriding STA failing to belong to the access group indicated by the TIM, to the corresponding STA. It is able to transmit the information on AID or the overriding access time information using a response frame (e.g., an ACK frame, a newly defined response frame, etc.) in response to a channel access frame (e.g., a PS-Poll frame, an uplink data frame, etc.) of the overriding STA. For instance, an STA performing an overriding transmits a PS-Poll frame and is able to receive an ACK frame including an information on an AID or an overriding access time information. In doing so, the overriding STA does not wait for a data transmission from an AP in direct. Instead, the overriding STA stands by to correspond to the channel access timing point or the overriding access time information in accordance with the AID information transmitted by the AP and then receives data from the AP. In this case, since the description of the response frame is as good as the foregoing description, details of the response frame shall be omitted from the following description.

In case that every channel access timing point associated with a bit location set to 0 in a bitmap within a TIM is used for an overriding STA like the example shown in FIG. 16, it is described for a situation of each STA with reference to FIG. 27 as follows.

Figure 27:
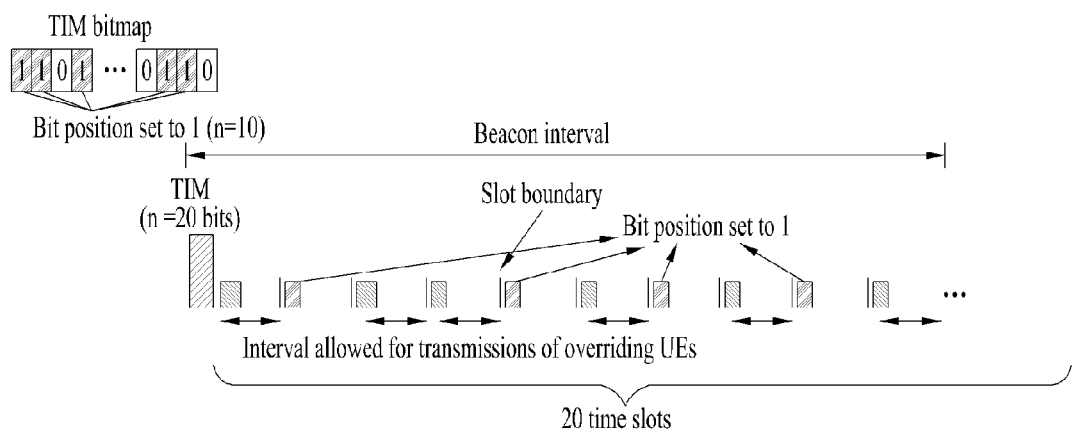

FIG. 27 is a diagram for one example of a channel access operation of an STA according to one embodiment of the present invention.

Referring to FIG. 27, like the former example shown in FIG. 26, an AP does not spread channel access timing points with the number (n) of STAs, of which bit is set to 1 in a bitmap of a TIM element. Instead, the AP is able to spread channel access timing points with the number (N) of all STAs belonging to the bitmap of the TIM element (irrespective of a bit setup value). In FIG. 27, a whole beacon interval is divided into 20 time slots related to all bits belonging to a bitmap of a TIM element. And, the 20 time slots are configured with 10 access time slots related to a bit location set to 1 in the bitmap of the TIM element and 10 access time slots (i.e., vacant time slots) related to a bit location set to 0 in the bitmap of the TIM element.

First of all, in case that STAs associated with an AP receive a corresponding TIM, since an STA attempting an overriding receives the TIM, the overriding STA can transmit a channel access frame (e.g., a PS-Poll or uplink data frame) at a timing point (i.e., a time slot) corresponding to the bit location set to 0 in the bitmap of the TIM element. In this case, an actual access applying timing point can be mapped to a location of bit using a specific permutation function. For instance, such a function can be determined as a function of parameters such as the number of all STAs belonging to a bitmap within a TIM element, the number of STAs set to 0 or 1 in the TIM element, a slot time and the like. If the number of STA(s) attempting an overriding in a single access time slot is at least one, channel access opportunity for a corresponding access slot can be obtained through contention (e.g., random back-off).

On the other hand, if an STA is unable to perform a TIM reception despite being associated with an AP, an STA attempting an overriding may not be able to attempt a channel access at a timing point corresponding to a bit location set to 0 in a bitmap of a TIM element. Thus, in case that an STA attempting an overriding transmits a channel access frame at a random timing point instead of transmitting a channel access frame (e.g., a PS-Poll or uplink data frame) at a timing point corresponding to a bit location set to 0 in a bitmap of a TIM element, an AP is able to directly assign vacant access time slots (e.g., slots corresponding to a part set to 0 in a TIM bitmap) to the overriding STA. In doing so, AID corresponding to the vacant access time slot can be temporarily assigned (or reassigned) to the overriding STA. The information on the assigned (reassigned) AID can be transmitted in a manner that the AP directly transmits information of the AID to the overriding STA. And, the AP can transmit an information (i.e., an overriding access time information) on an accessible timing point related to the corresponding AID. The information on the AID or the information on the accessible timing point can be transmitted through a response frame in response to the channel access frame (e.g., a PS-Poll frame, an uplink data frame, etc.) of the overriding STA. In this case, since the description of the response frame is as good as the foregoing description, details of the response frame shall be omitted from the following description.

Secondly, in case of STAs failing to be associated with an AP, the STA is able to receive a beacon (TIM element) transmitted from the corresponding AP despite failing to be associated with the corresponding AP. Thus, if the STA succeeds in a TIM reception, since the STA receives a TIM, the STA is able to transmit a channel access frame (e.g., a PS-Poll or uplink data frame) at a timing point (i.e., a tile slot) corresponding to a bit location set to 0 in a bitmap of a TIM element. In this case, an actual access applying timing point can be mapped to a location of bit using a specific permutation function. For instance, such a function can be determined as a function of parameters such as the number of all STAs belonging to a bitmap within a TIM element, the number of STAs set to 0 or 1 in the TIM element, a slot time and the like. If the number of STA(s) attempting an overriding in a single access time slot is at least one, channel access opportunity for a corresponding access slot can be obtained through contention (e.g., random back-off).

On the other hand, if an STA is not associated with an AP and is unable to receive a TIM reception, an STA attempting an overriding is unable to attempt a channel access at a timing point corresponding to a bit location set to 0 in a bitmap of a TIM element but is able to transmit an immediate channel access frame (e.g., a PS-Poll or uplink data frame). Thus, in case that an STA attempting an overriding transmits a channel access frame at a random timing point instead of transmitting a channel access frame (e.g., a PS-Poll or uplink data frame) at a timing point corresponding to a bit location set to 0 in a bitmap of a TIM element, an AP is able to directly assign vacant access time slots (e.g., slots corresponding to a part set to 0 in a TIM bitmap) to the overriding STA. In doing so, AID corresponding to the vacant access time slot can be temporarily assigned (or reassigned) to the overriding STA. The information on the assigned (reassigned) AID can be transmitted in a manner that the AP directly transmits information of the AID to the overriding STA. And, the AP can transmit an information (i.e., an overriding access time information) on an accessible timing point related to the corresponding AID. The information on the AID or the information on the accessible timing point can be transmitted through a response frame in response to the channel access frame (e.g., a PS-Poll frame, an uplink data frame, etc.) of the overriding STA. In this case, since the description of the response frame is as good as the foregoing description, details of the response frame shall be omitted from the following description.

The examples shown in FIG. 26 and FIG. 27 can be more effective to a case of assigning an access opportunity to an STA, which belongs to a corresponding group performing a TIM based access, in consideration of a part set to 0 in a bitmap of a TIM. In particular, when an access opportunity is mapped to a predetermined interval on a time, in case that the predetermined interval is scheduled as a channel access interval in consideration of the number of STAs buffered by removing a part set to 0 (i.e., a non-presence of a buffered data of the corresponding STA), it may cause a collision with an overriding STA. For instance, when each STA attempting an overriding intends to transmit a PS-Poll frame by determining that the overriding is possible at a timing point related to a bitmap part set to 0, since an STA in a group having a TIM bitmap based access opportunity assigned thereto may transmit a PS-Poll frame at that timing point, it may cause a collision between the two STAs. Hence, for the application of the above-mentioned method, when an access opportunity is assigned to an STA having a buffered data in accordance with a TIM bitmap, it is able to assign the access opportunity in consideration of the bitmap part set to 0 as well. In particular, as the part set to 0 in the TIM bitmap is pre-reserved for accesses of the overriding STAs, an access opportunity may not be assigned to an STA belonging to the corresponding group. Moreover, such a method is applicable to a case that there is an STA attempting a channel access randomly despite failing to belong to a corresponding access group among STAs having checked a beacon or a TIM information carried on the beacon. For instance, if a standby time (latency) to an access available interval of the corresponding STA is too long or the corresponding STA confirms that a load of an access group of the corresponding TIM is small according to checking the TIM information, such a method is applicable to a case that the corresponding STA attempts a channel access in such a special situation as an emergency, a power outage and the like.

Figure 28:
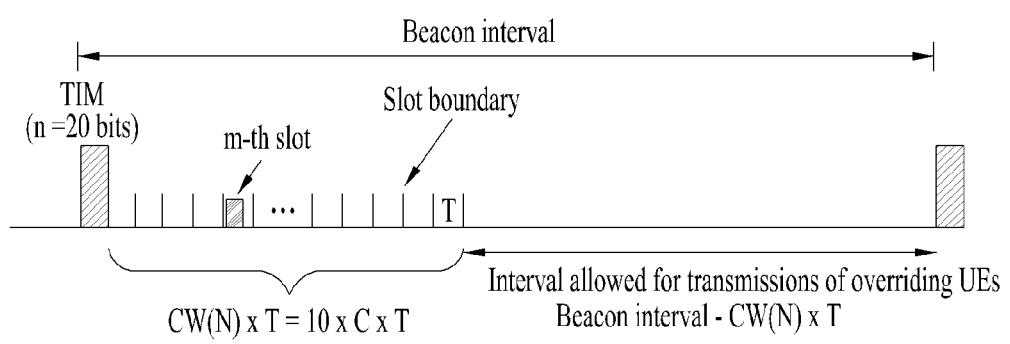
Figure 29:
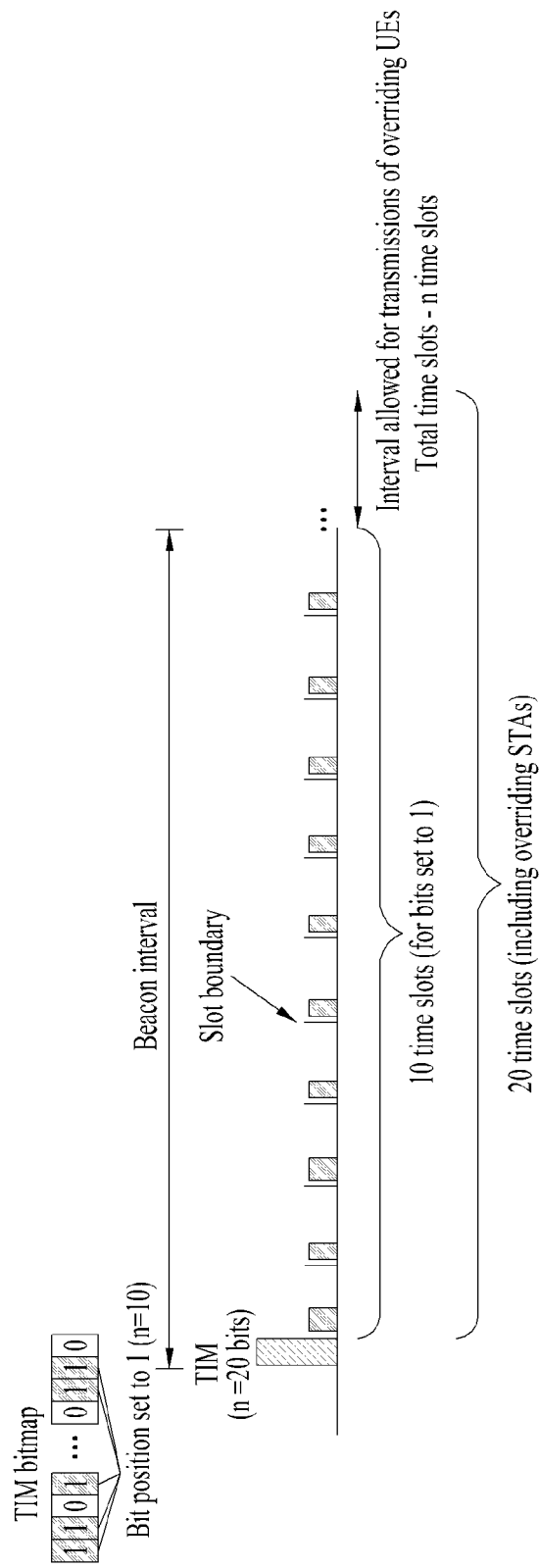

FIG. 28 and FIG. 29 are diagrams for examples of a channel access operation of an STA according to one embodiment of the present invention.

Referring to FIG. 28 and FIG. 29, an AP is able to spread a channel access timing point with the number (n) of STAs having a bit set to 1 in a bitmap of a TIM element. And, the AP is able to configure access intervals of overriding STAs in the rest part of the spread channel access timing points in a beacon or a TIM interval.

In FIG. 28, the rest of intervals except an interval (i.e., a size of a contention window (CW)) of a spread channel access timing point in a beacon interval can be configured as a channel access interval of an overriding STA. In this case, it is able to transmit an information (i.e., an overriding access time information) on the channel access interval of the overriding STA using a response frame (e.g., an ACK frame, a newly defined response frame, etc.) in response to a channel access frame (e.g., a PS-Poll frame, an uplink data frame, etc.) of the overriding STA. In this case, since the description of the response frame is as good as the foregoing description, details of the response frame shall be omitted from the following description.

In FIG. 29, access time slots of STAs having bit set to 1 during a beacon interval are not fully spread. Instead, the access time slots can be configured in a following manner. First of all, access time slots (i.e., first 10 time slots) of STAs having bit set to 1 are determined in order from a start point of a beacon interval and the rest of time slots (next 10 time slots) can be emptied for a channel access of an overriding STA. In this case, like the former example shown in FIG. 25, an AP is able to temporarily assign (or reassign) an AID corresponding to a vacant access time slot or transmit an information on a channel access timing point in order that overriding STAs failing to belong to an access group indicated by a TIM can perform channel accesses without affecting channel accesses of other STAs belonging to the corresponding group.

Meanwhile, an AP is able to transmit a segment TIM beacon in a manner that an information indicating whether to allow a corresponding access group to perform an overriding is included in the segment TIM beacon. In this case, having received the beacon including a TIM element, STAs are able to perform efficient channel accesses using the overriding allowed access group or an information on an overriding allowed group access interval.

First of all, each segment TIM beacon can be transmitted in a manner of including an information on a presence or non-presence of allowance for an overriding by an access group paged by the corresponding segment TIM beacon. Alternatively, each segment TIM beacon can be transmitted in a manner of including all information on an overriding allowed access group. In doing so, the information on the overriding allowed access group can be transmitted on each segment TIM beacon or may be periodically transmitted in a manner of being included in a general beacon (e.g., a DTIM beacon, a long beacon, etc.). For instance, assuming that 4 paging groups (i.e., channel access groups) exist, information on a presence or non-presence of allowance for an overriding per group can be transmitted with 4-bit bitmap (1 octet). Alternatively, an AP is able to transmit a beacon in a manner that an information on an interval (or time) for allowing an overriding is included in the beacon as well as a presence or non-presence of allowance for an overriding. In this case, the overriding allowed interval (or time) is the information notified to STAs through the beacon in advance. And, the overriding allowed interval (or time) can be set equal to or greater than an overriding allowed interval indicated if an STA failing to belong to the corresponding access group already attempts a channel access. According to the overriding allowed interval information included in the beacon, an allowed interval is configured with a predetermined interval (duration) until a timing point of transmitting a next segment TIM beacon or a general beacon or a time offset by starting from a timing point of transmitting a segment TIM beacon or a general beacon including the corresponding information. The above-mentioned informations can be transmitted in a manner of being included in a probe response message sent to an STA, an association (re-association) response message or the like as well as a segment beacon or a general beacon.

Figure 30:
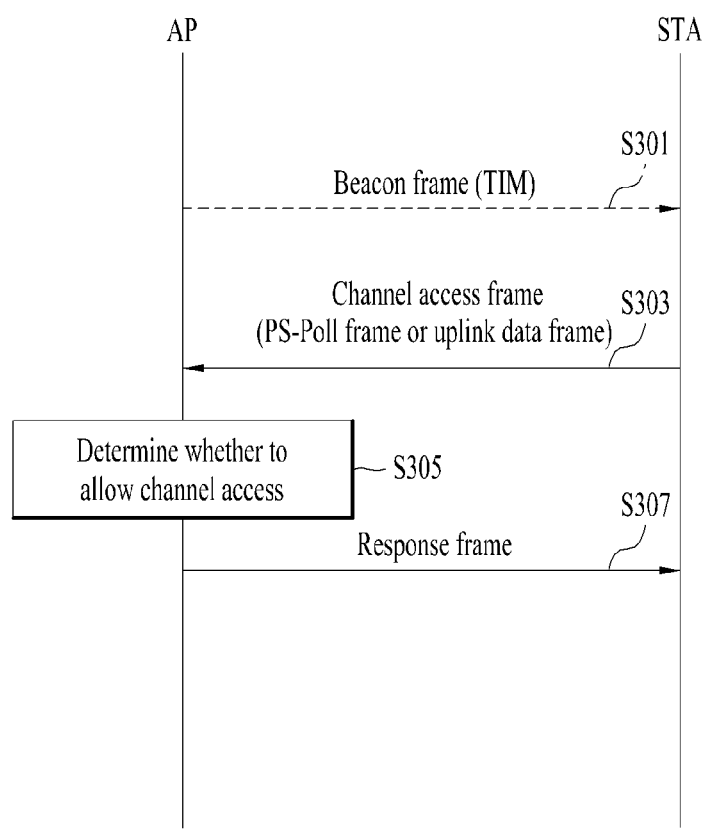
FIG. 30 is a diagram for one example of a channel access method according to one embodiment of the present invention.

FIG. 30 is a diagram for one example of a channel access method according to one embodiment of the present invention.

Referring to FIG. 30, an AP transmits a beacon frame including a TIM element periodically by broadcast to correspond to a beacon period [S301]. In particular, the TIM element can be transmitted in a manner of being sorted by access groups and may include a bitmap indicating a presence or non-presence of a downlink buffered data which is to be transmitted to an STA belonging to a corresponding access group.

In order to attempt a channel access in an interval of an access group interval to which the STA does not belong, the STA transmits a channel access frame (e.g., a PS-Poll frame, an uplink data frame, etc.) to the AP [S303]. In this case, the STA may include an STA having no association with the corresponding AP or an STA failing to belong to the access group indicated by the corresponding TIM element despite having the association with the corresponding AP.

Having received the beacon frame (or TIM element) transmitted by the AP, the STA is able to transmit the channel access frame to the AP. Alternatively, the STA can transmit the channel access frame to the AP without receiving the beacon frame (or TIM element) transmitted by the AP. In this case, it is able to skip the step S301.

Having received the channel access frame in the access group interval indicated by the corresponding TIM element from the STA failing to belong to the access group indicated by the TIM element, the AP determines whether to allow the channel access attempting STA to perform the channel access by considering whether a load in the corresponding group interval and a channel access timing point are assigned to another STA belonging to the corresponding access group [S305]. In doing so, if a channel access interval (e.g., a time slot) of STAs belonging to the group indicated by a TIM is determined based on a bitmap of the corresponding TIM, it is able to only allow the channel access of the STA failing to belong to the corresponding group in an interval other than the channel access interval of the STAs belonging to the corresponding group.

The AP transmits a response frame including an information indicating a presence or non-presence of allowance for the channel access to the STA attempting the channel access [S307]. In this case, the response frame can additionally carry an information indicating a presence or non-presence of a downlink buffered data to be transmitted to the STA having attempted the channel access in the group access interval of the group to which the STA fails to belong or an information on an interval in which the corresponding STA is allowed to perform a channel access.

The matters or substances mentioned in the foregoing descriptions of various embodiments of the present invention are applied independently or at least two embodiments of the present invention can be implemented in a manner of being applied simultaneously.

Figure 31:
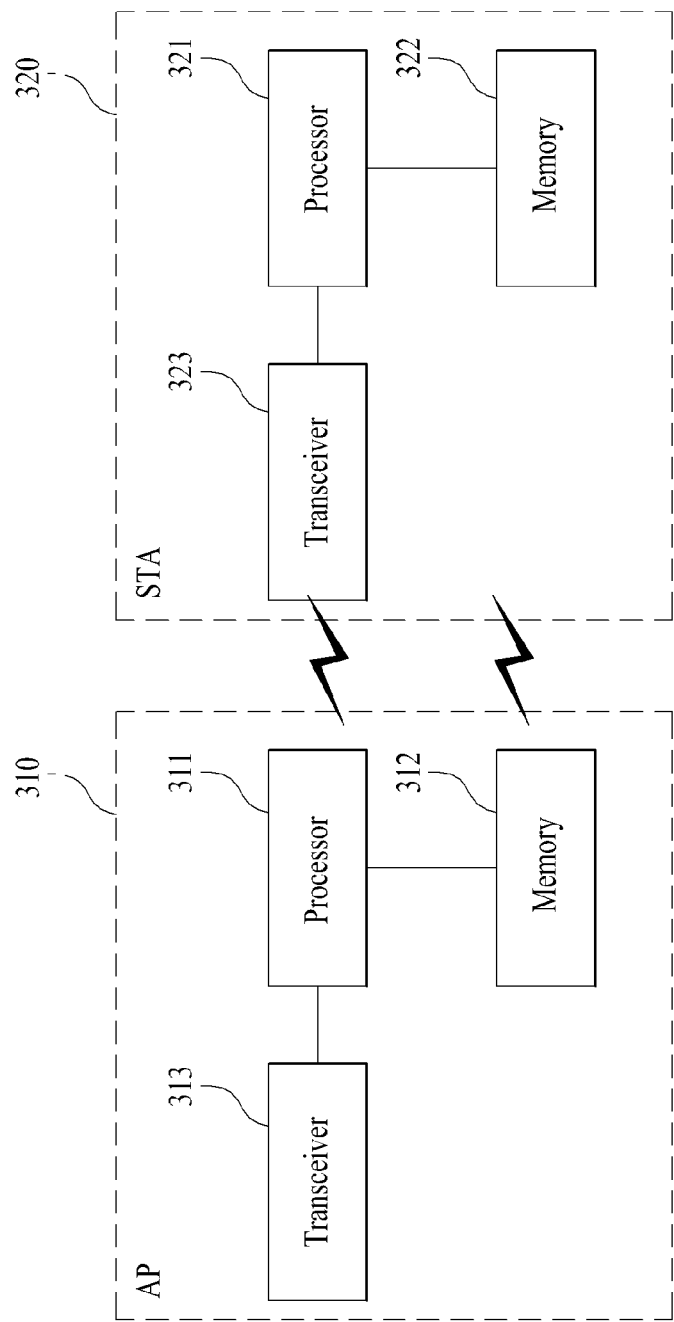
FIG. 31 is a block diagram for a configuration of a wireless device according to one embodiment of the present invention.

FIG. 31 is a block diagram for a configuration of a wireless device according to one embodiment of the present invention.

Referring to FIG. 31, an AP 310 includes a processor 311, a memory 312 and a transceiver 313. The processor 311 implements the functions, processes and/or methods proposed by the present invention. Layers of a radio interface protocol (cf. FIG. 5) can be implemented by the processor 311. The memory 312 is connected to the processor 311 and stores various kinds of informations for driving the processor 311. The transceiver 313 is connected to the processor 311 and then transmits and/or receives radio signals.

An STA 320 includes a processor 321, a memory 322 and a transceiver 323. The processor 321 implements the functions, processes and/or methods proposed by the present invention. Layers of a radio interface protocol (cf. FIG. 5) can be implemented by the processor 321. The memory 322 is connected to the processor 321 and stores various kinds of informations for driving the processor 321. The transceiver 323 is connected to the processor 321 and then transmits and/or receives radio signals.

The memory 312/322 may be included inside or outside the processor 311/321 and then connected to the processor 311/321 via a means known well to the public. Optionally, the AP 310 and/or the STA 320 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Various embodiments according to the present invention are mainly described with reference to the examples applying to IEEE 802.11 system and can identically apply to various kinds of wireless access systems as well as to IEEE 802.11 system.

What is claimed is:

1. A method of supporting channel access of an overriding station (STA) which does not belong to a group indicated by a traffic indication map (TIM) in a wireless communication system, the method comprising:
receiving, by an access point (AP), a channel access request frame in a TIM interval from the overriding STA; and
transmitting, by the AP, a response frame indicating whether the channel access is allowed to the overriding STA in response to the channel access request frame,
wherein the TIM interval includes a group channel access interval corresponding to a bit set to 1 in a TIM bitmap for a group STA that belongs to the group and an overriding channel access interval corresponding to a bit set to 0 in a TIM bitmap for the overriding STA, and wherein the channel access is allowed when an association ID (AID) corresponding to the bit set to 0 exists.

2. The method of claim 1, further comprising: transmitting, by the AP, information on the overriding channel access interval to the overriding STA.

3. The method of claim 2, wherein the information on the overriding channel access interval indicates an AID related to a bit assigned to the overriding STA among bits except bits indicating the group STA in the TIM bitmap.

4. The method of claim 2, wherein the information on the overriding channel access interval indicates an AID related to a bit assigned to the overriding STA among bits not set to 1 in the TIM bitmap.

5. The method of claim 2, wherein the information on the overriding channel access interval indicates an AID related to a bit assigned to the overriding STA among bits located next to a last bit set to 1 in the TIM bitmap.

6. The method of claim 1, wherein the channel access request frame comprises either a PS-Poll (power save-Poll) frame or an uplink data frame.

7. The method of claim 1, wherein a temporary AID is assigned to the overriding STA during the overriding channel access interval.

8. The method of claim 2, wherein the information indicates an AID for the overriding channel access interval within an expanded interval including a current TIM interval received the channel access request frame and another TIM interval after the current TIM interval.

9. A method of performing channel access by an overriding station (STA) which does not belong to a group indicated by a traffic indication map (TIM) in a wireless communication system, the method comprising:
transmitting a channel access request frame in a TIM interval to an access point (AP); and
receiving a response frame indicating whether the channel access is allowed from the AP in response to the channel access request frame,
wherein the TIM interval includes a group channel access interval corresponding to a bit set to 1 in a TIM bitmap for a group STA that belongs to the group and an overriding channel access interval corresponding to a bit set to 0 in a TIM bitmap for the overriding STA, and wherein the channel access is allowed when an association ID (AID) corresponding to the bit set to 0 exists.

10. The method of claim 9, further comprising:
receiving information on the overriding channel access interval in the TIM interval from the AP.

11. The method of claim 10, wherein the information on the overriding channel access interval indicates an AID related to a bit assigned to the overriding STA among bits except whole bits indicating the group STA in the TIM bitmap.

12. The method of claim 10, wherein the information on the overriding channel access interval indicates an AID related to a bit assigned to the overriding STA among bits not set to 1 in the TIM bitmap.

13. The method of claim 10, wherein the information on the overriding channel access interval indicates an AID related to a bit assigned to the overriding STA among bits located next to a last bit set to 1 in the TIM bitmap.

14. The method of claim 9, wherein the channel access request frame comprises either a PS-Poll (power save-Poll) frame or an uplink data frame.

15. The method of claim 9, wherein a temporary AID is assigned to the overriding STA during the overriding channel access interval.

16. A device supporting channel access for an overriding station (STA) which does not belong to a group indicated by a traffic indication map (TIM) in a wireless communication system, the device comprising:
a transceiver configured to transceive a radio signal; and
a processor configured to receive a channel access request frame in a TIM interval from the overriding STA, and transmit a response frame indicating whether the channel access is allowed to the overriding STA in response to the channel access request frame, wherein the TIM interval includes a group channel access interval corresponding to a bit set to 1 in a TIM bitmap for a group STA that belongs to the group and an overriding channel access interval corresponding to a bit set to 0 in a TIM bitmap for the overriding STA, and wherein the channel access is allowed when an association ID (AID) corresponding to the bit set to 0 exists.

17. A station (STA) device which does not belong to a group indicated by a traffic indication map (TIM) in a wireless communication system, the STA comprising:

a transceiver configured to transceive a radio signal; and a processor configured to transmit a channel access request frame in a TIM interval to an access point (AP), and receive a response frame indicating whether the channel access is allowed from the AP in response to the channel access request frame, wherein the TIM interval includes a group channel access interval corresponding to a bit set to 1 in a TIM bitmap for a group STA that belongs to the group and an overriding channel access interval corresponding to a bit set to 0 in a TIM bitmap for the STA, and wherein the channel access is allowed when an association ID (AID) corresponding to the bit set to 0 exists.

* * * * *